United States Patent
Yao et al.

[11] Patent Number: 6,136,946
[45] Date of Patent: Oct. 24, 2000

[54] PROCESS FOR PRODUCING HIGH-MOLECULAR-WEIGHT POLYCARBONATE AND ELECTROPHOTOGRAPHIC PHOTORECEPTOR USING POLYCARBONATE OBTAINED BY THE PROCESS

[75] Inventors: Kenji Yao; Masahiko Miyamoto; Ichiro Takegawa; Michiko Aida, all of Minami Ashigara, Japan

[73] Assignee: Fuji Xerox Co., Ltd., Tokyo, Japan

[21] Appl. No.: 09/318,850

[22] Filed: May 26, 1999

[30] Foreign Application Priority Data

Jun. 25, 1998 [JP] Japan ................................. 10-178409
Oct. 29, 1998 [JP] Japan ................................. 10-307977

[51] Int. Cl.$^7$ ................................................. C08G 64/00
[52] U.S. Cl. ........................................... 528/196; 528/198
[58] Field of Search ..................................... 528/196, 198

[56] References Cited

FOREIGN PATENT DOCUMENTS 57-30847  2/1982  Japan .
57-128344 8/1982  Japan .

*Primary Examiner*—Terressa M. Boykin
*Attorney, Agent, or Firm*—Oliff & Berridge, PLC

[57] ABSTRACT

Provided are a process for producing a high-molecular-weight polycarbonate, which comprises polymerizing a diol and a carbonate diester through transesterification with heating in the presence of a basic oxide catalyst, and an electrophotographic photoreceptor containing this high-molecular-weight polycarbonate as a binder resin. This process can easily produce the high-molecular-weight polycarbonate safely without having an adverse effect on humans and environment. This electrophotographic photoreceptor can provide a high-quality image having a high stability at high speed over a long period of time.

16 Claims, 5 Drawing Sheets

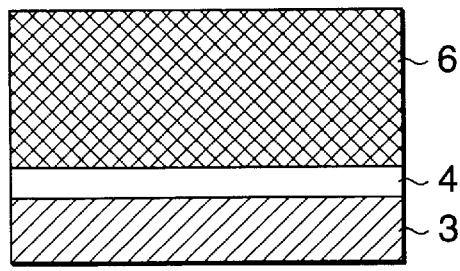
FIG.6
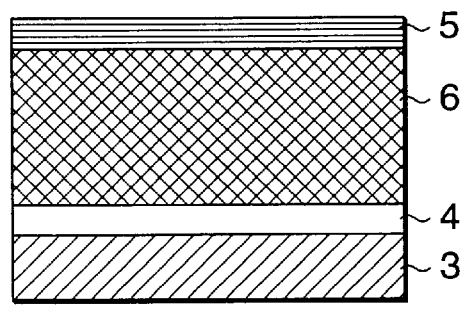
FIG.7
FIG.8
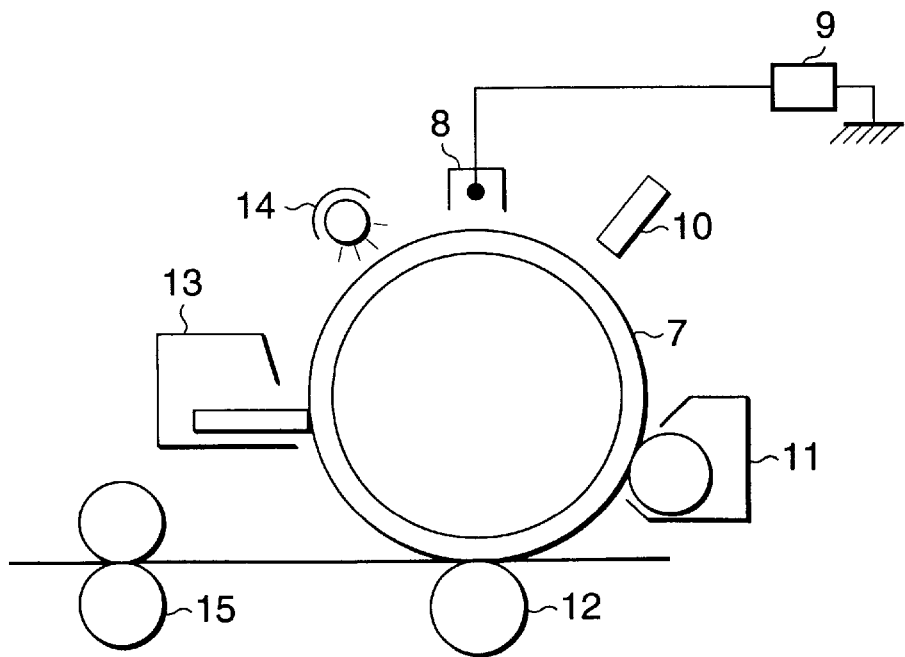

PROCESS FOR PRODUCING HIGH-MOLECULAR-WEIGHT POLYCARBONATE AND ELECTROPHOTOGRAPHIC PHOTORECEPTOR USING POLYCARBONATE OBTAINED BY THE PROCESS

FIELD OF THE INVENTION

The present invention relates to a process for producing a high-molecular-weight polycarbonate by transesterification and an electrophotographic photoreceptor using the resulting high-molecular-weight polycarbonate. More specifically, it relates to a process for producing a high-molecular-weight polycarbonate by transesterification using a halogen-free starting material and an electrophotographic photoreceptor using the high-molecular-weight polycarbonate obtained by the process as a binder resin.

BACKGROUND OF THE INVENTION

A polycarbonate is a resin having diverse characteristics such as a transparency owing to its amorphous property, a high heat resistance, excellent mechanical strengths and a good moldability, and its demand has rapidly been increased. It finds wide acceptance in, for example, building materials, optical disk substrates, automobile parts, optical lenses and functional films. Further, in recent years, it has been demanded as a glass substitute in view of a safety and a light weight and as a metallic material substitute in view of environmental problems. The development of a large number of polycarbonates to meet these demands has been conducted.

Under these circumstances, mechanical strengths at high levels have further been required in special fields of automobile engine-related parts, spectacle lenses and electrophotographic photoreceptor parts, and polycarbonates having a much higher molecular weight than usual polycarbonates have been in demand.

Meanwhile, since a high-quality image is obtained at high speed in an electrophotographic apparatus, it has been increasingly used in the fields of a copier and a laser beam printer. In an electrophotographic photoreceptor used in the electrophotographic apparatus, inorganic photoconductive materials such as selenium, a selenium-tellurium alloy, a selenium-arsenic alloy and cadmium sulfide have been used. However, an electrophotographic photoreceptor using disposable organic photoconductive materials which can easily be produced at low cost in comparison to these materials has been mainly used. Especially, a functional separation-type laminated organic photoreceptor formed by laminating a charge generation layer that generates a charge through exposure and a charge transfer layer that transfers a charge upon using these organic photoconductive materials is excellent in electrophotographic properties such as an electric sensitivity, a chargeability and a stability in repetitive use. Accordingly, various electrophotographic receptors have been proposed, and have already been put to practical use.

By the way, an organic photoreceptor is generally inferior in mechanical strengths to an inorganic photoreceptor, and is damaged or worn out through rubbing by a mechanical external force with a cleaning blade, a developing brush or a paper. This wear deteriorates electrical characteristics of a photoreceptor, and it has therefore a short life. Further, a system using a contact charge method which has been lately employed from the aspect of ecology much increases the wear of the photoreceptor in comparison to a charging system with. Thus, the problem has become more serious. When the wear is increased, the photosensitivity of the photoreceptor is reduced, a fog occurs in a copy or a charge potential is decreased to decrease a copy density. Accordingly, the development of surface layer materials, such as a binder resin and a charge transfer material, by which to form a photoreceptor having a satisfactory durability, has been in demand.

A flexible electrophotographic photoreceptor in which a coating of a photoreceptive layer is formed on a film of polyethylene terephthalate having an electroconductive layer obtained through deposition is formed into a belt, whereby an electrophotographic apparatus can repetitively be used. Therefore, it is advantageous in that the shape of the electrophotographic apparatus can freely be diversified. However, a photoreceptor has to fully follow the flexible movement. For example, photoreceptors using various polycarbonate resins as a binder resin of a surface layer have been proposed.

When a coating of a photoreceptive layer is formed by a coating step using a binder resin which has been ordinarily used, a belt-like electrophotographic photoreceptor having a relatively good durability is obtained, but mechanical strengths thereof are not said to be at satisfactory levels. It has been problematic in that when it is repetitively rotated in a belt driving device of a copier for a long period of time, a photoreceptive layer is cracked, and this crack appears in a copy image as a crack pattern.

In order to solve the problems, a binder resin having excellent mechanical properties and flexibility has been in high demand. From this aspect, a polycarbonate has been widely used at present. However, a polycarbonate used as a binder resin in a photoreceptive layer of an electrophotographic photoreceptor has a relatively high molecular weight in comparison to those used in other usage. Specifically, a weight average molecular weight calculated as polystyrene has to be 50,000 or more. A method for obtaining such a high-molecular-weight polycarbonate has been currently limited to a phosgene method using phosgene as a starting material.

However, phosgene is a chemical substance that is quite harmful to humans. Accordingly, a method for producing a polycarbonate using triphosgene or chloroformate as a starting material instead of this phosgene has been studied. These materials are, however, also harmful to humans, and this method uses a halogen that has an adverse effect on environment. Thus it is not said to be a completely safe method.

On the other hand, as a typical example of a method for producing a polycarbonate in the absence of a halogen, a transesterification method using diphenyl carbonate as a starting material has been known. In this method, a polycarbonate is thermally decomposed through heating, and a melt viscosity is quite high. The upper limit of the weight average molecular weight of the resulting polycarbonate is limited to approximately 30,000. Thus, in the conventional transesterification method, a polycarbonate having a weight average molecular weight of 50, 000 or more cannot be produced.

As has been stated above, the development of an electrophotographic photoreceptor using as a binder resin a high-molecular-weight polycarbonate produced in the absence of a halogen has been in high demand because the adverse effect on humans and environment can be eliminated.

SUMMARY OF THE INVENTION

The invention has been made in view of the situation in the conventional art. That is, it is an object of the invention to provide a process for easily producing a high-molecular-weight polycarbonate which process is safe to humans and has no adverse effect on environment. Another object of the invention is to provide an electrophotographic photoreceptor having a good oxidation resistance, an excellent long-term stability and an excellent durability related with mechanical strengths.

The inventors have assiduously conducted investigations to produce a high-molecular-weight polycarbonate that has no adverse effect on humans and environment, and have consequently found that a high-molecular-weight polycarbonate can easily be produced by transesterification in the presence of a specific catalyst using a diol and a carbonate diester as starting materials, that an electrophotographic photoreceptor using a substantially halogen-free high-molecular-weight polycarbonate obtained by this process as a binder resin is excellent in a long-term stability to air oxidation and has quite an excellent durability related with mechanical strengths, that mechanical deterioration of a photoreceptive layer can be eliminated even when the photoreceptor is repetitively rotated in an electrophotographic apparatus as a drum-like photoreceptor or a belt-like photoreceptor for a long period of time, and that it is useful not only from the environmental aspect but also from the functional aspect. These findings have led to the completion of the invention.

That is, a process for producing a high-molecular-weight polycarbonate in the invention is characterized in that a diol and a carbonate diester are polymerized through transesterification with heating in the presence of a basic oxide catalyst.

The high-molecular-weight polycarbonate of the invention is preferably produced from a solution that is formed by cooling a substance resulting from polymerization through transesterification and dissolving the same in a solvent. Further, the weight average molecular weight is preferably 50,000 or more (calculated as polystyrene). Still further, the amount of the basic oxide catalyst used in this process is preferably between 20 and 100 ppm based on the resulting high-molecular-weight polycarbonate.

Preferable examples of the diol in the production of the high-molecular-weight polycarbonate in the invention include bisphenols, hydrogenated bisphenols, biphenols, hydrogenated biphenols, aryldiols, cycloalkanediols and aliphatic diols. These may be used either singly or in combination. Further, preferable examples of the carbonate diester include diaryl carbonates and dialkyl carbonates. These may be used either singly or in combination.

The electrophotographic photoreceptor of the invention is characterized in that a photoreceptive layer formed on an electroconductive support contains as a binder resin a high-molecular-weight polycarbonate obtained by polymerizing a diol and a carbonate diester through transesterification with heating in the presence of a basic oxide catalyst.

The electrophotographic apparatus of the invention is characterized in that it is charged by a contact charge system using the electrophotographic photoreceptor.

BRIEF DESCRIPTION OF THE DRAWINGS

FIG. 6 is a diagrammatic sectional view showing a layer structure of another monolayer-type electrophotographic photoreceptor in the invention.

FIG. 7 is a diagrammatic sectional view showing a layer structure of still another monolayer-type electrophotographic photoreceptor in the invention.

FIG. 8 is a schematic view of an electrophotographic apparatus used in the invention.

Figure 1:
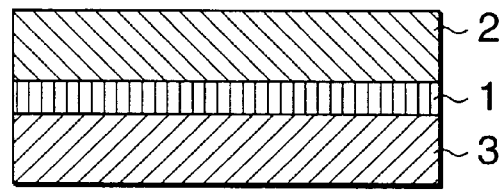
FIG. 1 is a diagrammatic sectional view showing a layer structure of a laminated electrophotographic photoreceptor in the invention.

In the drawings, 1 is a charge generation layer, 2 a charge transfer layer, 3 an electroconductive support, 4 an undercoat layer, 5 a protective layer, 6 a photoreceptive layer, 7 a photoreceptor, 8 a corona discharge-type charge member, 9 a power source, 10 an image input device, 11 a developer, 12 a transfer device, 13 a cleaning device, 14 a static eliminator, 15 a fixing device and 16 a contact charge member.

DETAILED DESCRIPTION OF THE INVENTION

First, a process for producing a high-molecular-weight polycarbonate in the invention is described. In the invention, a diol and a carbonate diester used as starting materials are free from a halogen atom which is harmful to humans and has an adverse effect on environment in the chemical structures thereof.

A method in which the diol and the carbonate diester are used as starting materials, a catalyst is added thereto, the mixture is heated under reduced pressure, and transesterification thereby proceeds to obtain a polycarbonate has been already known. However, in the conventional transesterification, thermal decomposition of the resulting polycarbonate is accelerated in the latter half of the reaction to form a polycarbonate having a weight average molecular weight of less than 30,000, and a polycarbonate having a weight average molecular weight of 50,000 or more cannot be produced. Further, a polycarbonate has a peculiar property of quite a high melt viscosity. Especially, a high-molecular-weight polycarbonate is hard to extrusion-mold.

For these reasons, in the conventional transesterification, a polycarbonate having such a relatively low molecular weight that an upper limit of a weight average molecular weight is approximately 30,000 is produced. Thus, it has been impossible to obtain a high-molecular-weight polycarbonate having a weight average molecular weight of 50,000 or more, especially 80,000 or more which is used in special fields of automobile engine-related parts, spectacle lenses or electrophotographic photoreceptor parts for which high mechanical strengths are required as stated above.

However, in the invention, the problems are solved by the following process which can easily produce a high-molecular-weight polycarbonate having a weight average molecular weight of 50, 000 or more, preferably 80, 000 or more, calculated as polystyrene.

The invention is first characterized in that a basic oxide is used as a catalyst. When the basic oxide catalyst is used in the transesterification of the diol and the carbonate diester, there are advantages that it is effective for expediting a reaction of forming the polycarbonate under specific reaction conditions, and the decomposition reaction of the polycarbonate is inhibited.

The invention is second characterized in that the amount of the basic oxide used as a catalyst is limited to a relatively small amount, and this can expedite the reaction of forming the high-molecular-weight polycarbonate having a high weight average molecular weight. The amount of the basic oxide catalyst is between 20 and 100 ppm, preferably between 50 and 80 ppm based on the theoretical amount of the high-molecular-weight polycarbonate formed, and this is a preferable amount in which to expedite the reaction of forming the polycarbonate. When the amount is less than 20 ppm, the reaction of forming the polycarbonate does not proceed satisfactorily, and is completed with a low molecular weight, making it impossible to obtain a high-molecular-weight polycarbonate having a weight average molecular weight of 50,000 or more. Meanwhile, when it exceeds 100 ppm, the reaction of forming the polycarbonate proceeds, but the decomposition reaction occurs actively at the same time. Accordingly, the molecular weight is not raised satisfactorily either, making it impossible to obtain a high-molecular-weight polycarbonate having a weight average molecular weight of 50,000 or more.

The invention is third characterized in that the resulting molten polycarbonate is cooled, then dissolved in a solvent, and collected. Generally, when a polycarbonate has such a high molecular weight that a weight average molecular weight is 50,000 or more, it has quite a high melt viscosity, though it varies depending on the chemical structure. For example, polycarbonate A obtained by polymerization of bisphenol A and diphenyl carbonate and having a weight average molecular weight of 50,000 has a melt viscosity of 100,000 poises even at a high temperature of 300° C. Usually, an upper limit of a melt viscosity capable of extrusion is deemed to be 10,000 poises. Therefore, collection by extrusion cannot be conducted with this melt viscosity.

Thus, the invention has enabled a high-molecular-weight polycarbonate having a weight average molecular weight of 50,000 or more which is formed by polymerization through transesterification to be easily collected, without extrusion in a molten state, in a state of a solution obtained by once cooling the polycarbonate to room temperature and dissolving it in a solvent or in a recrystallized state formed by charging the solution in a poor solvent of a polycarbonate.

The basic oxide catalyst used in the process for producing the high-molecular-weight polycarbonate in the invention is selected from oxides of transition metals and heavy metals. Specific examples thereof include zinc oxide, antimony trioxide, lead oxide, iron oxide, iron dioxide, iron trioxide, germanium oxide and cobalt oxide. However, these are not critical in the invention. Of these, zinc oxide is effective for controlling the reaction because the normal transesterification is expedited and the reverse reaction is inhibited.

The starting materials used to produce the high-molecular-weight polycarbonate in the invention are a diol and a carbonate diester. The starting diol in the invention is not particularly limited. Specific examples thereof include bisphenols such as 2,2-bis(4-hydroxyphenyl)propane and 1,1-bis(4-hydroxyphenyl)cyclohexane; biphenols such as (1,1'-biphenyl)-4,4'-diol; hydrogenated bisphenols; hydrogenated biphenols such as (1,1'-bicyclohexyl)-4,4'-diol; aryldiols such as 2,6-naphthalenediol; cycloalkanediols such as 1,4-cyclohexanediol; and aliphatic diols such as ethylene glycol. These diols are all available for producing the high-molecular-weight polycarbonate in the invention. They may be used either singly or in combination.

Further, the starting carbonate diester in the invention is not particularly limited. Specific examples thereof include diaryl carbonates such as diphenyl carbonate and dinaphthyl carbonate; and dialkyl carbonates such as dimethyl carbonate, diethyl carbonate, dipropyl carbonate, di(1-methylethyl) carbonate, dibutyl carbonate, di(1-methylpropyl) carbonate and di(1,1-dimethylethyl) carbonate. These carbonate diesters are all available for producing the high-molecular-weight polycarbonate in the invention. They may be used either singly or in combination.

In the invention, the solvent used to dissolve the resulting polycarbonate is not particularly limited so long as it can dissolve the predetermined polycarbonate. Specific examples thereof include cyclic ethers such as tetrahydrofuran and dioxane; chlorinated aliphatic hydrocarbons such as dichloromethane and chloroform; chlorinated aromatic hydrocarbons such as monochlorobenzene; aromatic hydrocarbons such as toluene and xylene; esters such as methyl acetate, ethyl acetate, propyl acetate and isopropyl acetate; aliphatic hydrocarbons such as cyclohexane and cyclohexanone; and ketones such as methyl ethyl ketone and methyl isopropyl ketone. Of these, tetrahydrofuran having a high solubility of a polycarbonate and free from a halogen is preferable.

Further, the poor solvent by which to precipitate the molten polycarbonate in the invention is not particularly limited so long as it does not dissolve a desired polycarbonate at all. Specific examples thereof include water; aliphatic alcohols such as methanol, ethanol, isopropyl alcohol, n-butanol and isopentyl alcohol; and aliphatic hydrocarbons such as cyclohexanone. Of these, water which is not harmful to humans and environment is preferable.

Next, with respect to the process for producing the high-molecular-weight polycarbonate in the invention, the conditions for production using the zinc oxide catalyst are specifically described.

First, the diol and the carbonate diester as starting materials and the zinc oxide catalyst in predetermined amounts are charged into a reaction vessel at room temperature. Immediately after the charging, the inside of the reaction vessel is fully purged with nitrogen. The pressure reduction is then started, and the pressure is reduced to approximately 10 mmHg. The reaction vessel is heated to between 160 and 220°, though the temperature varies depending on types or chemical structures of starting compounds used. When 80% or more of the theoretical amount of alcohol is evaporated, the pressure of the reaction vessel is reduced to 1 torr over the course of from 1 to 3 hours.

Subsequently, the temperature is elevated to between 220 to 260° C. at a rate of 20° C./hour, and further to between 280 and 350° C. at a rate of 10° C./hour. The stirring torque of the reaction vessel is monitored at this temperature and reduced pressure of 1 torr or less. When this torque reaches a predetermined value corresponding to the weight average molecular weight of the desired high-molecular-weight polycarbonate, the stirring stops to complete the polymerization.

Thereafter, the reaction vessel is allowed to stand until the temperature is decreased to room temperature. When room temperature is reached, a predetermined amount of a solvent in which to dissolve the resulting polycarbonate is charged in the reaction vessel, and the stirring is conducted again.

This stirring torque is monitored. When the torque is returned to a value corresponding to a state in which the resulting polycarbonate is completely dissolved, the solution is charged into a poor solvent, precipitated, and filtered to obtain a desired high-molecular-weight polycarbonate.

In the process of the invention, the reaction temperature is appropriately selected to adapt to the structure of the desired polycarbonate. For example, in a polycarbonate with a high glass transition temperature in which bisphenols or biphenyls are used as a main component, it is advisable to set a high reaction temperature in each step. Further, in a polycarbonate with a relatively low glass transition temperature in which hydrogenated bisphenols or hydrogenated biphenyls are used as a main component, it is advisable to set a low reaction temperature in each step. Still further, in a polycarbonate in which naphthalenediol is used as a main component, it is important to set a high reaction temperature because its melt viscosity is high.

Next, the electrophotographic photoreceptor of the invention is described.

The electrophotographic photoreceptor of the invention is characterized by using, as the binder resin of the photoreceptive layer, the high-molecular-weight polycarbonate which is produced by the polymerization through transesterification with heating using the diol and the carbonate diester as starting materials in the presence of the basic oxide as a catalyst. The high-molecular-weight polycarbonate used in the invention is preferably a high-molecular-weight polycarbonate obtained from a solution formed by conducting polymerization through transesterification with heating at a temperature corresponding to the structure of the polymer in the presence of the basic oxide catalyst at a rate of from 20 to 100 ppm based on the theoretical amount of the resulting polycarbonate, cooling the polycarbonate formed without extrusion in the molten state and dissolving the same in a solvent, and which has a weight average molecular weight of approximately 50,000 or more, calculated as polystyrene.

As the high-molecular-weight polycarbonate used in the invention, any polycarbonate can be used regardless of the main chain skeleton of the polymer so long as it is obtained by the above-mentioned process. Examples thereof include bisphenol carbonates such as bisphenol A, Z, P and F polycarbonates; biphenyl polycarbonates; hydrogenated bisphenol carbonates; hydrogenated biphenyl carbonates; aryldiol polycarbonates such as phenylenediol and naphthol polycarbonates; cycloalkane polycarbonates such as cyclohexane dimethylol and tricyclodecane dithiol; aliphatic diol polycarbonates such as ethylene glycol polycarbonate; and copolymers thereof.

Of these, bisphenol polycarbonates and biphenol polycarbonates are preferable because these have quite an excellent durability related with mechanical strengths. Therefore, when a photoreceptor obtained by using the same as a binder resin is repetitively rotated for a long period of time in an electrophotographic apparatus as a drum-like photoreceptor or a belt-like photoreceptor, an excellent performance is provided without mechanical deterioration of a photoreceptive layer. Further, hydrogenated bisphenol polycarbonates and hydrogenated biphenol polycarbonates are excellent in a flexibility. Especially when they are used in a belt-like photoreceptor, an excellent durability is provided.

In addition, the polycarbonate used in the invention has characteristics that it is substantially free from a halogen and has quite a high stability to air oxidation, and it is useful in view of the environment and the performance.

The molecular weight of the high-molecular-weight polycarbonate used in the invention is appropriately selected in view of the film-forming conditions such as the film thickness of the photoreceptive layer and the solvent used in the formation of the photoreceptive layer or mechanical properties such as a wear resistance. The weight average molecular weight calculated as polystyrene is usually 50,000 or more, preferably between 50,000 and 300,000. When the weight average molecular weight is less than 50,000, the mechanical strengths of the resin are decreased, and the wear resistance is decreased. Meanwhile, when the weight average molecular weight exceeds 300,000, the activity of the charge transfer material is suppressed to decrease an electric sensitivity, though it varies depending on the structure of the polycarbonate. Besides, the film-forming property becomes poor, and the surface property of the photoreceptor is worsened.

In the invention, as the charge transfer material of the photoreceptive layer, any known material having a charge transfer property is available. It is advisable to use a benzidine compound represented by formula (I) and/or a triarylamine compound represented by formula (II).

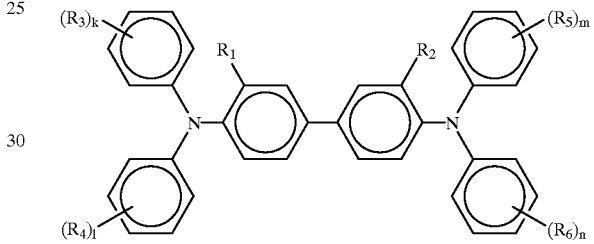

(I)

wherein $R_1$ and $R_2$ may be the same or different, and each represents a hydrogen atom, an alkyl group, an alkoxy group or a halogen atom, $R_3$ and $R_6$ may be the same or different, and each represents a hydrogen atom, an alkyl group, an alkoxy group, a halogen atom or a substituted amino group, and k to n are each 1 or 2.

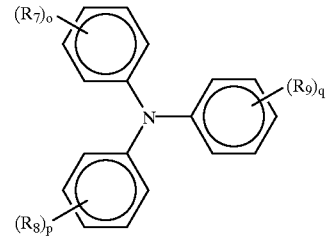

(II)

wherein $R_7$ and $R_8$ may be the same or different, and each represents a hydrogen atom, an alkyl group, an alkoxy group or a halogen atom, $R_9$ represents a hydrogen atom, an alkyl group having from 1 to 4 carbon atoms or an aryl group having from 6 to 12 carbon atoms, and o to q are each 1 or 2.

Specific examples of the benzidine compound represented by formula (I) are shown in Tables 1 to 3.

TABLE 1

| Compound No. | $R_1$ | $(R_3)_k$ | $(R_4)_l$ | $R_2$ | $(R_5)_m$ | $(R_6)_n$ |
|---|---|---|---|---|---|---|
| 1-1 | H | 3-CH$_3$ | H | H | 3-CH$_3$ | H |
| 1-2 | H | 4-CH$_3$ | H | H | 4-CH$_3$ | H |
| 1-3 | H | 3-C$_2$H$_5$ | H | H | 3-C$_2$H$_5$ | H |
| 1-4 | CH$_3$ | H | H | CH$_3$ | H | H |
| 1-5 | CH$_3$ | 2-CH$_3$ | H | CH$_3$ | 2-CH$_3$ | H |
| 1-6 | CH$_3$ | 3-CH$_3$ | H | CH$_3$ | 3-CH$_3$ | H |
| 1-7 | CH$_3$ | 4-CH$_3$ | H | CH$_3$ | 4-CH$_3$ | H |
| 1-8 | CH$_3$ | 4-CH$_3$ | 2-CH$_3$ | CH$_3$ | 4-CH$_3$ | 2-CH$_3$ |
| 1-9 | CH$_3$ | 4-CH$_3$ | 3-CH$_3$ | CH$_3$ | 4-CH$_3$ | 3-CH$_3$ |
| 1-10 | CH$_3$ | 4-CH$_3$ | 4-CH$_3$ | CH$_3$ | 4-CH$_3$ | 4-CH$_3$ |
| 1-11 | CH$_3$ | 3,4-CH$_3$ | H | CH$_3$ | 3,4-CH$_3$ | H |
| 1-12 | CH$_3$ | 3,4-CH$_3$ | 3,4-CH$_3$ | CH$_3$ | 3,4-CH$_3$ | 3,4-CH$_3$ |
| 1-13 | CH$_3$ | 4-C$_2$H$_5$ | H | CH$_3$ | 4-C$_2$H$_5$ | H |
| 1-14 | CH$_3$ | 4-C$_3$H$_7$ | H | CH$_3$ | 4-C$_3$H$_7$ | H |
| 1-15 | CH$_3$ | 4-C$_4$H$_9$ | H | CH$_3$ | 4-C$_4$H$_9$ | H |
| 1-16 | CH$_3$ | 4-C$_2$H$_5$ | 2-CH$_3$ | CH$_3$ | 4-C$_2$H$_5$ | 2-CH$_3$ |
| 1-17 | CH$_3$ | 4-C$_2$H$_5$ | 3-CH$_3$ | CH$_3$ | 4-C$_2$H$_5$ | 3-CH$_3$ |
| 1-18 | CH$_3$ | 4-C$_2$H$_5$ | 4-CH$_3$ | CH$_3$ | 4-C$_2$H$_5$ | 4-CH$_3$ |
| 1-19 | CH$_3$ | 4-C$_2$H$_5$ | 3,4-CH$_3$ | CH$_3$ | 4-C$_2$H$_5$ | 3,4-CH$_3$ |
| 1-20 | CH$_3$ | 4-C$_3$H$_7$ | 3-CH$_3$ | CH$_3$ | 4-C$_3$H$_7$ | 3-CH$_3$ |
| 1-21 | CH$_3$ | 4-C$_3$H$_7$ | 4-CH$_3$ | CH$_3$ | 4-C$_3$H$_7$ | 4-CH$_3$ |
| 1-22 | CH$_3$ | 4-C$_4$H$_9$ | 3-CH$_3$ | CH$_3$ | 4-C$_4$H$_9$ | 3-CH$_3$ |
| 1-23 | CH$_3$ | 4-C$_4$H$_9$ | 4-CH$_3$ | CH$_3$ | 4-C$_4$H$_9$ | 4-CH$_3$ |
| 1-24 | CH$_3$ | 4-C$_2$H$_5$ | 4-C$_2$H$_5$ | CH$_3$ | 4-C$_2$H$_5$ | 4-C$_2$H$_5$ |
| 1-25 | CH$_3$ | 4-C$_2$H$_5$ | 4-OCH$_3$ | CH$_3$ | 4-C$_2$H$_5$ | 4-OCH$_3$ |

TABLE 2

| Compound No. | $R_1$ | $(R_3)_k$ | $(R_4)_l$ | $R_2$ | $(R_5)_m$ | $(R_6)_n$ |
|---|---|---|---|---|---|---|
| 1-26 | CH$_3$ | 4-C$_3$H$_7$ | 4-C$_3$H$_7$ | CH$_3$ | 4-C$_3$H$_7$ | 4-C$_3$H$_7$ |
| 1-27 | CH$_3$ | 4-C$_3$H$_7$ | 4-OCH$_3$ | CH$_3$ | 4-C$_3$H$_7$ | 4-OCH$_3$ |
| 1-28 | CH$_3$ | 4-C$_4$H$_9$ | 4-C$_4$H$_9$ | CH$_3$ | 4-C$_4$H$_9$ | 4-C$_4$H$_9$ |
| 1-29 | CH$_3$ | 4-C$_4$H$_9$ | 4-OC$_4$H$_9$ | CH$_3$ | 4-C$_4$H$_9$ | 4-OC$_4$H$_9$ |
| 1-30 | H | 3-CH$_3$ | H | H | 3-CH$_3$ | H |
| 1-31 | Cl | H | H | Cl | H | H |
| 1-32 | Cl | 2-CH$_3$ | H | Cl | 2-CH$_3$ | H |
| 1-33 | Cl | 3-CH$_3$ | H | Cl | 3-CH$_3$ | H |
| 1-34 | Cl | 4-CH$_3$ | H | Cl | 4-CH$_3$ | H |
| 1-35 | Cl | 4-CH$_3$ | 2-CH$_3$ | Cl | 4-CH$_3$ | 2-CH$_3$ |
| 1-36 | Cl | 4-CH$_3$ | 3-CH$_3$ | Cl | 4-CH$_3$ | 3-CH$_3$ |
| 1-37 | Cl | 4-CH$_3$ | 4-CH$_3$ | Cl | 4-CH$_3$ | 4-CH$_3$ |
| 1-38 | C$_2$H$_5$ | H | H | C$_2$H$_5$ | H | H |
| 1-39 | C$_2$H$_5$ | 2-CH$_3$ | H | C$_2$H$_5$ | 2-CH$_3$ | H |
| 1-40 | C$_2$H$_5$ | 3-CH$_3$ | H | C$_2$H$_5$ | 3-CH$_3$ | H |
| 1-41 | C$_2$H$_5$ | 4-CH$_3$ | H | C$_2$H$_5$ | 4-CH$_3$ | H |
| 1-42 | C$_2$H$_5$ | 4-CH$_3$ | 4-CH$_3$ | C$_2$H$_5$ | 4-CH$_3$ | 4-CH$_3$ |
| 1-43 | C$_2$H$_5$ | 4-C$_2$H$_5$ | 4-CH$_3$ | C$_2$H$_5$ | 4-C$_2$H$_5$ | 4-CH$_3$ |
| 1-44 | C$_2$H$_5$ | 4-C$_3$H$_7$ | 4-CH$_3$ | C$_2$H$_5$ | 4-C$_3$H$_7$ | 4-CH$_3$ |
| 1-45 | C$_2$H$_5$ | 4-C$_4$H$_9$ | 4-CH$_3$ | C$_2$H$_5$ | 4-C$_4$H$_9$ | 4-CH$_3$ |
| 1-46 | OCH$_3$ | H | H | OCH$_3$ | H | H |
| 1-47 | OCH$_3$ | 2-CH$_3$ | H | OCH$_3$ | 2-CH$_3$ | H |
| 1-48 | OCH$_3$ | 3-CH$_3$ | H | OCH$_3$ | 3-CH$_3$ | H |
| 1-49 | OCH$_3$ | 4-CH$_3$ | H | OCH$_3$ | 4-CH$_3$ | H |
| 1-50 | OCH$_3$ | 4-CH$_3$ | 4-CH$_3$ | OCH$_3$ | 4-CH$_3$ | 4-CH$_3$ |

TABLE 3

| Compound No. | $R_1$ | $(R_3)_k$ | $(R_4)_l$ | $R_2$ | $(R_5)_m$ | $(R_6)_n$ |
|---|---|---|---|---|---|---|
| 1-51 | OCH$_3$ | 4-C$_2$H$_5$ | 4-CH$_3$ | OCH$_3$ | 4-C$_2$H$_5$ | 4-CH$_3$ |
| 1-52 | OCH$_3$ | 4-C$_3$H$_7$ | 4-CH$_3$ | OCH$_3$ | 4-C$_3$H$_7$ | 4-CH$_3$ |
| 1-53 | OCH$_3$ | 4-C$_4$H$_9$ | 4-CH$_3$ | OCH$_3$ | 4-C$_4$H$_9$ | 4-CH$_3$ |
| 1-54 | CH$_3$ | 2-N(CH$_3$)$_2$ | H | CH$_3$ | 2-N(CH$_3$)$_2$ | H |
| 1-55 | CH$_3$ | 3-N(CH$_3$)$_2$ | H | CH$_3$ | 3-N(CH$_3$)$_2$ | H |
| 1-56 | CH$_3$ | 4-N(CH$_3$)$_2$ | H | CH$_3$ | 4-N(CH$_3$)$_2$ | H |
| 1-57 | CH$_3$ | 4-Cl | H | CH$_3$ | 4-Cl | H |
| 1-58 | H | 3-CH$_3$ | H | H | H | H |
| 1-59 | H | 4-C$_3$H$_7$ | 4-CH$_3$ | OCH$_3$ | 4-C$_3$H$_7$ | 4-CH$_3$ |
| 1-60 | H | 4-C$_4$H$_9$ | 4-CH$_3$ | OCH$_3$ | 4-C$_4$H$_9$ | 4-CH$_3$ |
| 1-61 | H | 2-N(CH$_3$)$_2$ | H | CH$_3$ | 2-N(CH$_3$)$_2$ | H |
| 1-62 | H | 3-N(CH$_3$)$_2$ | H | CH$_3$ | 3-N(CH$_3$)$_2$ | H |
| 1-63 | H | 4-N(CH$_3$)$_2$ | H | CH$_3$ | 4-N(CH$_3$)$_2$ | H |
| 1-64 | H | 4-Cl | H | CH$_3$ | 4-Cl | H |
| 1-65 | CH$_3$ | 3-N(CH$_3$)$_2$ | H | CH$_3$ | H | 4-CH$_3$ |
| 1-66 | CH$_3$ | 4-N(CH$_3$)$_2$ | H | CH$_3$ | H | 4-CH$_3$ |
| 1-67 | CH$_3$ | 4-Cl | H | CH$_3$ | H | 4-CH$_3$ |

Next, specific examples of the triarylamine compound represented by formula (II) are shown in Tables 4 and 5.

TABLE 4

| Compound No. | $(R_7)_o$ | $(R_8)_p$ | $(R_9)_q$ |
|---|---|---|---|
| 2-1 | H | H | H |
| 2-2 | H | H | 2-CH$_3$ |
| 2-3 | H | H | 3-CH$_3$ |
| 2-4 | H | H | 4-CH$_3$ |
| 2-5 | H | 2-CH$_3$ | 2-CH$_3$ |
| 2-6 | H | 2-CH$_3$ | 3-CH$_3$ |
| 2-7 | H | 2-CH$_3$ | 4-CH$_3$ |
| 2-8 | H | 3-CH$_3$ | 3-CH$_3$ |
| 2-9 | H | 3-CH$_3$ | 4-CH$_3$ |
| 2-10 | H | 4-CH$_3$ | 4-CH$_3$ |
| 2-11 | 2-CH$_3$ | 2-CH$_3$ | 2-CH$_3$ |
| 2-12 | 2-CH$_3$ | 2-CH$_3$ | 3-CH$_3$ |
| 2-13 | 2-CH$_3$ | 2-CH$_3$ | 4-CH$_3$ |
| 2-14 | 2-CH$_3$ | 3-CH$_3$ | 3-CH$_3$ |
| 2-15 | 2-CH$_3$ | 3-CH$_3$ | 4-CH$_3$ |
| 2-16 | 2-CH$_3$ | 4-CH$_3$ | 4-CH$_3$ |
| 2-17 | 3-CH$_3$ | 3-CH$_3$ | 3-CH$_3$ |
| 2-18 | 3-CH$_3$ | 3-CH$_3$ | 4-CH$_3$ |
| 2-19 | 3-CH$_3$ | 4-CH$_3$ | 4-CH$_3$ |
| 2-20 | 4-CH$_3$ | 4-CH$_3$ | 4-CH$_3$ |
| 2-21 | 2,4-CH$_3$ | H | H |
| 2-22 | 2,4-CH$_3$ | 3-CH$_3$ | 3-CH$_3$ |
| 2-23 | 2,4-CH$_3$ | 4-CH$_3$ | 4-CH$_3$ |
| 2-24 | 3,5-CH$_3$ | 3-CH$_3$ | 3-CH$_3$ |
| 2-25 | 3,5-CH$_3$ | 4-CH$_3$ | 4-CH$_3$ |
| 2-26 | 3,5-CH$_3$ | H | H |
| 2-27 | H | H | 2-C$_6$H$_5$ |
| 2-28 | H | H | 3-C$_6$H$_5$ |
| 2-29 | H | H | 4-C$_6$H$_5$ |
| 2-30 | 2-CH$_3$ | 2-CH$_3$ | 4-C$_6$H$_5$ |
| 2-31 | 3-CH$_3$ | 3-CH$_3$ | 4-C$_6$H$_5$ |
| 2-32 | 4-CH$_3$ | 4-CH$_3$ | 4-C$_6$H$_5$ |
| 2-33 | 3,4-CH$_3$ | 3,4-CH$_3$ | 4-C$_6$H$_5$ |
| 2-34 | 3,4-CH$_3$ | 3,4-CH$_3$ | 3-CH$_3$ |
| 2-35 | 3,4-CH$_3$ | 3,4-CH$_3$ | 4-CH$_3$ |
| 2-36 | 3,4-CH$_3$ | H | 4-C$_6$H$_5$ |
| 2-37 | 3,4-CH$_3$ | 3-CH$_3$ | 4-C$_6$H$_5$ |
| 2-38 | 3,4-CH$_3$ | 3-CH$_3$ | 4-C$_6$H$_5$ |
| 2-39 | 3,4-CH$_3$ | 4-CH$_3$ | 4-C$_6$H$_5$ |
| 2-40 | 3,4-CH$_3$ | H | H |
| 2-41 | 4-CH$_3$ | 3-OCH$_3$ | H |
| 2-42 | 4-CH$_3$ | 4-OCH$_3$ | H |
| 2-43 | 3,4-CH$_3$ | 3-OCH$_3$ | H |
| 2-44 | 3,4-CH$_3$ | 4-OCH$_3$ | H |
| 2-45 | 4-CH$_3$ | 4-OCH$_3$ | 4-C$_6$H$_5$ |
| 2-46 | 3,4-CH$_3$ | 4-OCH$_3$ | 4-C$_6$H$_5$ |

TABLE 5

| Compound No. | $(R_7)_o$ | $(R_8)_p$ | $(R_9)_q$ |
| --- | --- | --- | --- |
| 2-47 | 2-CH$_3$ | 2-CH$_3$ | 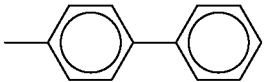 |
| 2-48 | 3-CH$_3$ | 3-CH$_3$ | 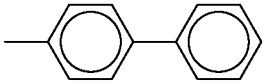 |
| 2-49 | 4-CH$_3$ | 4-CH$_3$ | 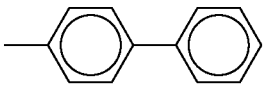 |
| 2-50 | 2-CH$_3$ | 2-CH$_3$ | 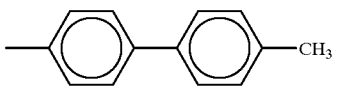 |
| 2-51 | 3-CH$_3$ | 3-CH$_3$ | 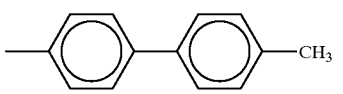 |
| 2-52 | 4-CH$_3$ | 4-CH$_3$ | 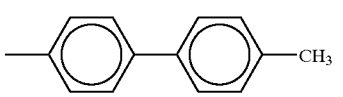 |
| 2-53 | 2-CH$_3$ | 2-CH$_3$ | 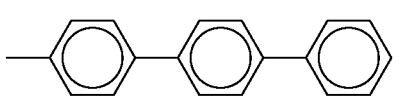 |
| 2-54 | 3-CH$_3$ | 3-CH$_3$ | 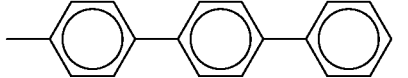 |
| 2-55 | 4-CH$_3$ | 4-CH$_3$ | 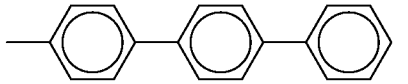 |

Further, the electrophotographic photoreceptor of the invention is described by referring to the drawings. FIGS. 1 to 7 are diagrammatic sectional views each showing the layer structure of the electrophotographic photoreceptor in the invention.

Figure 2:
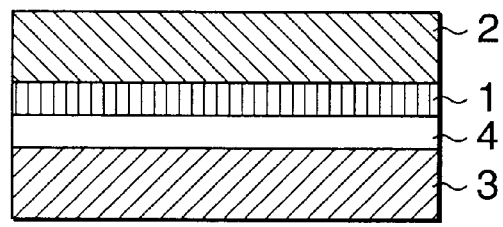
FIG. 2 is a diagrammatic sectional view showing a layer structure of another laminated electrophotographic photoreceptor in the invention.
Figure 3:
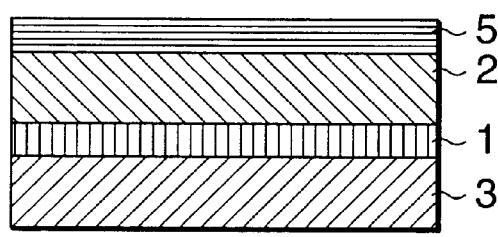
FIG. 3 a diagrammatic sectional view showing a layer structure of still another laminated electrophotographic photoreceptor in the invention.
Figure 4:
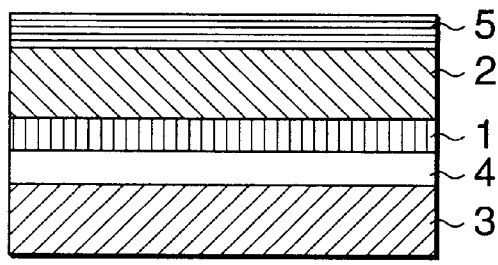
FIG. 4 is a diagrammatic sectional view showing a layer structure of the other laminated electrophotographic photoreceptor in the invention.

In FIGS. 1 to 4, the photoreceptive layer is of a laminated structure. In FIG. 1, a charge generation layer 1 is mounted on an electroconductive support 3, and a charge transport layer 2 is mounted thereon. In FIG. 2, an undercoat layer 4 is interposed between the electroconductive support 3 and the charge generation layer 1. In FIG. 3, a protective layer 5 is further mounted on the surface of the layer structure in FIG. 1. In FIG. 4, both the undercoat layer 4 and the protective layer 5 are further mounted on the layer structure in FIG. 1.

Figure 5:
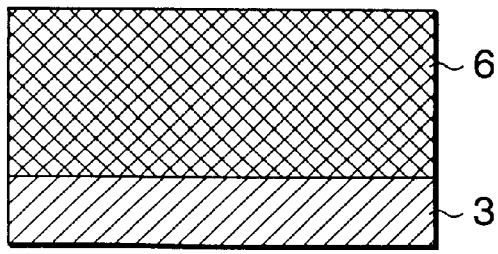
FIG. 5 is a diagrammatic sectional view showing a layer structure of a monolayer-type electrophotographic photoreceptor in the invention.

In FIGS. 5 to 7, the photoreceptive layer is of a monolayer structure. In FIG. 5, a photoreceptive layer 6 is mounted on the electroconductive support. In FIG. 6, the undercoat layer 4 is interposed between the electroconductive support and the photoreceptive layer. In FIG. 7, both the undercoat layer 4 and the protective layer 5 are mounted on the layer structure in FIG. 5. The polymer or the copolymer having the recurring unit of formula (I) in the invention can be used as a binder resin of the photoreceptive layer in any of the photoreceptors having the layer structures shown in FIGS. 1 to 7.

Each layer of the electrophotographic photoreceptor in the invention is described in detail below.

In the electrophotographic photoreceptor of the invention, a known material such as a drum-like material, a sheet-like material or a plate-like material obtained by depositing a metal such as aluminum, copper, gold, silver, platinum, palladium, titanium, an nickel-chromium alloy, stainless steel or a copper-indium alloy on a drum of a metal such as aluminum, copper, iron, zinc, nickel or SUS stainless steel, a sheet, a paper, a plastic or a glass, or depositing an electroconductive metal compound such as indium oxide or tin oxide thereon, or laminating a metal foil thereon, or coating thereon a dispersion of carbon black, indium oxide, a tin oxide-antimony oxide powder, a metallic powder or copper iodide in a binder resin for electroconductive treatment is used as the electroconductive support.

When a metallic pipe is used as the electroconductive support, the surface thereof may be either untreated or treated previously by mirror lathing, etching, anode oxidation, rough lathing, centerless lathing, sandblasting or wet horning. Especially, a support having a roughened surface is preferable because a moire density irregularity caused by coherent light in the photoreceptor when using a coherent light source such as a laser beam can be prevented.

The undercoat layer is formed by using a high-molecular compound, for example, an acetal resin such as polyvinyl butyral, a polyvinyl alcohol resin, casein, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin or a melamine resin, and an organometallic compound containing a zirconium, titanium, aluminum, manganese or silicon atom. These compounds can be used singly, in combination or as a polycondensate. Of these, a product containing an organometallic compound containing zirconium or silicon has such excellent properties that the residual potential is low, the change in the potential depending on environment is reduced and the change in the potential by the repetitive use is reduced.

Further, the undercoat layer can contain various organic or inorganic fine powders in order to improve the electrical characteristics or the light scattering property. Specific examples thereof include organic pigments such as a polycyclic quinoline pigment having an electron transfer property, a perylene pigment and an azo pigment; inorganic pigments, for example, white pigments such as titanium oxide, zinc oxide, zinc white, zinc sulfide, lead white and lithopone and extender pigments such as alumina, calcium carbonate and barium sulfate; teflon resin particles; benzoguanamine resin particles; and styrene resin particles. The particle diameter of the fine powders is between 0.01 and 2 $\mu$m. The fine powders are added as required. The amounts of the fine powders are between 10 and 80% by weight, preferably between 30 and 70% by weight based on the solid content of the undercoat layer.

When the fine powders are used to prepare the undercoat layer coating solution, the fine powders are dispersed in a solution containing the resin component. The dispersing of the fine powders is conducted using a roll mill, a ball mill, a vibration ball mill, an attritor, a sand mill, a colloid mill or a paint shaker. The thickness of the undercoat layer is preferably between 0.1 and 10 $\mu$m.

In the invention, the photoreceptive layer formed on the undercoat layer may be basically either of a monolayer structure (monolayer photoreceptor) or of a laminated structure (laminated photoreceptor) divided into a charge generation layer and a charge transport layer according to a performance. Further, with respect to the lamination order of the charge generation layer and the charge transport layer in the laminated structure, it is preferable that the charge transport layer is mounted on the upper layer for utilizing the effect provided by a combination of the high-molecular-weight polycarbonate used as the binder resin in the invention and the charge transport material.

The use of the high-molecular-weight polycarbonate in the invention can improve the wear resistance of the photoreceptor and decrease the surface damage in the photoreceptor having the charge transport layer as the surface layer. Further, it can improve the mechanical life on the flexibility in the belt-like photoreceptor even though the polycarbonate is present in either the upper or the lower portion of the layer structure. In addition, the photoreceptor of any layer structure in the invention can provide excellent electrical characteristics and give high-quality images.

The charge generation layer of the photoreceptive layer is obtained by forming a charge generation material through vacuum deposition or coating the same with an organic solvent and a binder resin through dispersion. Examples of the charge generation material include selenium compounds and selenium alloys such as amorphous selenium, crystalline selenium, a selenium-tellurium alloy and a selenium-arsenic alloy; inorganic photoconductive materials such as zinc oxide and titanium oxide; and organic pigments and dyes, for example, phthalocyanine pigments such as metal-free phthalocyanine, titanyl phthalocyanine, copper phthalocyanine, tin phthalocyanine and gallium phthalocyanine, squalium-type, anthoanthrone-type, perylene-type, azo-type, anthraquinone-type, pyrene-type, pyrylium salt and thiapyrylium salt. Further, these organic pigments have generally several crystal forms. Especially, with respect to the phthalocyanine pigments, various crystal forms including an $\alpha$-form and a $\beta$-form are known. However, the phthalocyanine pigments having any of these crystal forms can be used so long as they are pigments that provide a desired sensitivity. Among others, the phthalocyanine pigments are preferably used in the invention.

In the invention, it is especially preferable to use the following phthalocyanines as a charge generation material that provides especially excellent properties in relation to the polymer or the copolymer used in the photoreceptive layer, particularly the charge transport layer.

chlorogallium phthalocyanine having diffraction peaks at at least 7.4°, 16.6°, 25.5° and 28.3° in the Bragg angle (2 $\theta\pm0.2°$) in an X-ray diffraction spectrum using Cuk$\alpha$ rays, hydroxygallium phthalocyanine having diffraction peaks at at least 7.5°, 9.9°, 12.5°, 16.3°, 18.6°, 25.1° and 28.1° in the Bragg angle (2 $\theta\pm0.2°$) in an X-ray diffraction spectrum using Cuk$\alpha$ rays, and titanyl phthalocyanine having diffraction peaks at at least 9.5°, 11.7°, 15.0°, 24.1° and 27.3° in the Bragg angle (2 $\theta\pm0.2°$) in an X-ray diffraction spectrum using Cuk$\alpha$ rays.

Examples of the binder resin used in the charge generation layer include the high-molecular-weight polycarbonate produced by the process of the invention, a polyester resin, a polyallylate resin, a methacrylic resin, an acrylic resin, a polyvinyl chloride resin, a polystyrene resin, a polyvinyl acetate resin, a styrene-butadiene copolymer, a vinylidene chloride-acrylonitrile copolymer, a vinyl chloride-vinyl acetate-maleic anhydride copolymer, a silicone resin, a silicone-alkyd resin, a phenol-formaldehyde resin, a styrene-alkyd resin and poly-N-vinylcarbazole.

These binder resins can be used either singly or in combination. The weight ratio of the charge generation material to the binder resin is preferably between 10:1 and 1:10. Further, the thickness of the charge generation layer is usually between 0.01 and 5 $\mu$m, preferably between 0.05 and 2.0 $\mu$m. The charge generation material is dispersed in the resin using a roll mill, a ball mill, a vibration ball mill, an attritor, a mill, a sand mill, a colloid mill or a homogenizer.

In the electrophotographic photoreceptor of the invention, additives such as an antioxidant, a light stabilizer and a heat stabilizer can be added to the photoreceptive layer for preventing deterioration of the photoreceptive layer by ozone or an oxidative gas occurring in the electrophotographic apparatus, light or heat. Examples of the antioxidant include hindered phenol, hindered amine, p-phenylenediamine, arylalkane, hydroquinone, spirochroman, spiroindanone, derivatives thereof, organosulfur compounds and organophosphorus compounds.

Of these antioxidants, organosulfur and organophosphorus antioxidants are called secondary antioxidants, and the combined use thereof with primary antioxidants such as phenol and amine compounds can provide a synergistic effect.

Examples of the light stabilizer include benzophenone, benzotriazole, dithiocarbamate and tetramethylpiperidine derivatives.

Further, the electrophotographic photoreceptor of the invention contains one or more electron acceptive substances for improving a photoreceptivity, decreasing a residual potential and reducing fatigue in repetitive use. Examples of the usable electron acceptive substances include succinic anhydride, maleic anhydride, dibromomaleic anhydride, phthalic anhydride, tetrabromophthalic anhydride, tetracyanoethylene, tetracyanoquinodimethane, o-dinitrobenzene, m-dinitrobenzene, chloranil, dinitroanthraquinone, trinitrofluorenone, picric acid, o-nitrobenzoic acid, p-nitrobenzoic acid and phthalic acid. Of these, fluorenone compounds, quinoline compounds and benzene derivatives having electron attractive substituents such as Cl, CN and $NO_2$ are especially preferable.

The charge transport layer can be formed by coating thereon a solution obtained by dissolving the charge transport substance and the binder resin in an appropriate solvent, and drying the coated layer. Examples of the solvent used to form the charge transport layer include aromatic hydrocarbons such as benzene, toluene and chlorobenzene; ketones such as acetone and 2-butanone; halogenated aliphatic hydrocarbons such as methylene chloride, chloroform and ethylene chloride; cyclic or linear ethers such as tetrahydrofuran, dioxane, ethylene glycol and diethyl ether; and a mixed solvent thereof. The mixing ratio of the charge transport material to the binder resin is preferably between 10:1 and 1:5. Further, the film thickness of the charge transport layer is usually between 5 and 50 $\mu$m, preferably between 10 and 40 $\mu$m. When the film thickness is less than 5 $\mu$m, the influence of the wear on deterioration of electrical characteristics of the photoreceptor is increased to shorten the life. When the film thickness exceeds 50 $\mu$m, the charge transport property is decreased.

Further, a small amount of a silicone oil can also be added to the coating solution as a leveling agent for improving a flatness of the coating surface.

The coating can be conducted by dip coating, ring coating, spray coating, bead coating, blade coating or roller coating according to the shape and the use of the photoreceptor. With respect to the drying, it is advisable to conduct the heat-drying after touch-drying at room temperature. The heat-drying is preferably conducted at a temperature of from 30 to 200° C. for from 5 minutes to 2 hours.

A surface protective layer is formed on the photoreceptive layer as required. As the surface protective layer, there is an insulation resin protective layer or a protective layer of a low resistance obtained by adding a resistance modifier to an insulation resin. In case of the protective layer of the low resistance, for example, a layer obtained by dispersing electroconductive fine particles in the insulation resin is taken up. As the electroconductive fine particles, white, gray or pale white fine particles having an average particle diameter of 0.3 $\mu$m or less, preferably 0.1 $\mu$m or less and having an electric resistivity of $10^9$ $\Omega$·cm or less are appropriate. Examples thereof include molybdenum oxide, tungsten oxide, antimony oxide, tin oxide, titanium oxide, indium oxide, solid solution of tin oxide and antimony or antimony oxide and a mixture thereof, a product obtained by mixing single particles with these metal oxides, and a product obtained by coating these metal oxides on single particles. Of these, tin oxide and a solid solution of tin oxide and antimony or antimony oxide are preferably used because they can appropriately control an electric resistivity and render the protective layer substantially transparent (refer to JP-A-57-30847 and JP-A-57-128344). Further, examples of the insulation resin include condensation resins such as a polyamide, a polyurethane, a polyester, an epoxy resin, a polyketone and a polycarbonate; and vinyl polymers such as polyvinyl ketone, polystyrene and polyacrylamide.

The electrophotographic photoreceptor obtained by the invention can be used in electrophotographic apparatuses such as a light lens copier, a laser beam printer which is emitted with near infrared light or visible light, a digital copier, a LED printer and a laser facsimile. Further, this photoreceptor can be used in combination with a one-component or two-component regular developer or inversion developer. Still further, the electrophotographic photoreceptor produced by the invention exhibits good properties with less occurrence of a current leak even when it is used in a contact charging system using a charging roll or a charging brush.

The electrophotographic apparatus of the invention is described below.

Figure 9:
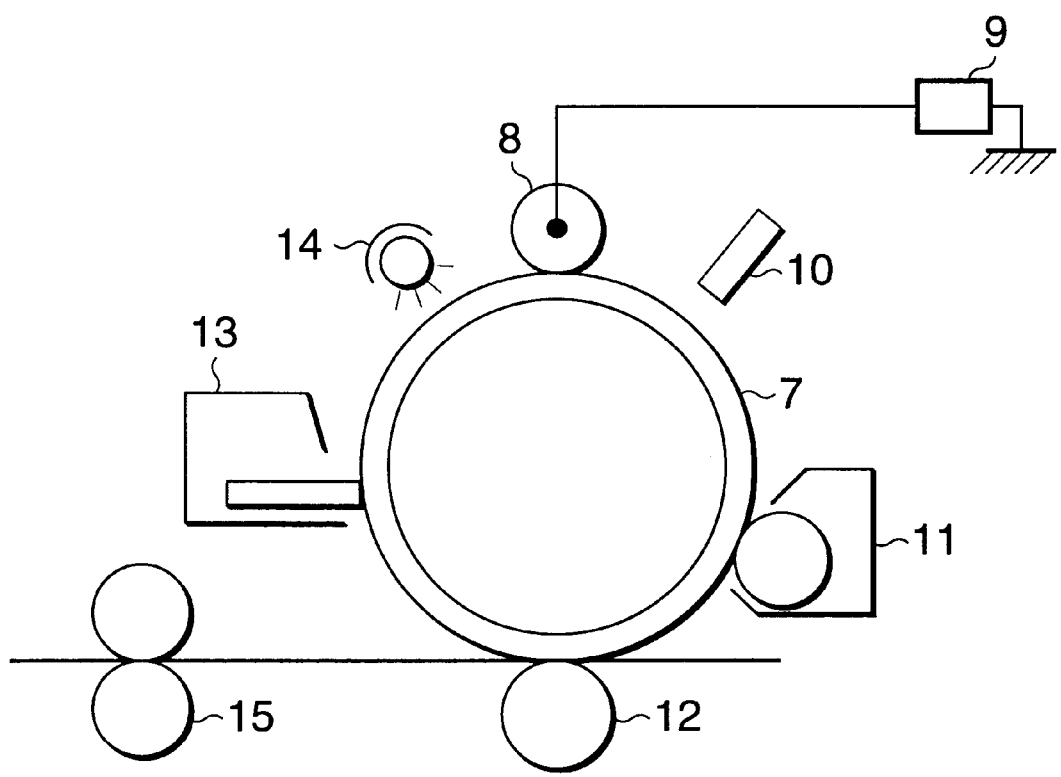
FIG. 9 is a schematic view of a contact charge-type electrophotographic apparatus used in the invention.

FIG. 8 is a schematic view of an electrophotographic apparatus using the electrophotographic photoreceptor of the invention. 7 is a photoreceptor, and a charging member 8 of a corona discharging system is mounted for charging. A voltage is applied to the charging member 8 from a power source 9. An image input device 10, a developing device 11, a transfer device 12, a cleaning device 13 and a static eliminator 14 are mounted around the photoreceptor. 15 is a fixing device. Further, FIG. 9 is a schematic view of a contact charging-type electrophotographic apparatus using the electrophotographic photoreceptor of the invention. The photoreceptor 7 is provided with the charging member 8 in contact therewith. The static eliminator 14 is not indispensable for this type of the contact charge-type electrophotographic apparatus.

The invention can easily produce the high-molecular-weight polycarbonate having the weight average molecular weight of 50,000 or more which has been strongly required in specific fields of automobile engine-related parts, spectacle lenses and electrophotographic photoreceptor parts in the absence of a halogen harmful to humans and environment. Further, it is quite useful for providing a higher-molecular-weight polycarbonate than as usual by the safe process having an excellent industrial productivity.

In addition, the coating of the photoreceptor obtained by using the high-molecular-weight polycarbonate as a binder resin of a surface layer is quite high in the wear resistance and the bending strength, and the electrical characteristics and the image qualities are excellent in the repetitive use also. Accordingly, the electrophotographic photoreceptor of the invention can also be used in a high-speed copier. Further, even in the belt-like photoreceptor, cracks do not occur even in the photoreceptive layer. Still further, the absence of chlorine eliminates the corrosion of the photoreceptor owing to residual chlorine, and a high durability is provided. Furthermore, in the image formation using the electrophotographic photoreceptor of the invention, image qualities can be obtained with a high stability at high speed over a long period of time. Accordingly, it is quite useful.

EXAMPLES

The invention is illustrated more specifically by referring to the following Examples. However, the invention is not limited thereto.

Example 1

1,1-Bis(4-hydroxyphenyl)cyclohexane (0.80 mols), 0.88 mols of diphenyl carbonate and 7.1 mg of zinc oxide were charged into a 1-liter polymerizer. Immediately after the charging, the inside of the polymerizer was thoroughly purged with nitrogen, and the pressure was then reduced to 30 mmHg. Under this reduced pressure, the content was heated to 180° C., and the stirring of the content was started at 150 rpm. At this time, a top temperature of a fractionating column was elevated to 140° C., and the distillation of phenol was started. Further, the reaction was conducted for 1 hour while maintaining the temperature of the content at 180° C. When the amount of phenol distilled exceeded 80% of the theoretical amount, the pressure inside the polymerizer was progressively reduced to 0.7 torr over the course of 1 hour. At this time, the amount of phenol distilled exceeded 90% of the theoretical amount.

Subsequently, the temperature of the content was elevated to 260° C. at a rate of 20° C./hour and further to 300° C. at a rate of 10° C./hour. The reaction was conducted for 7 hours while maintaining this temperature and the degree of vacuum of 1 torr or less. When the increase in the stirring torque in the polymerizer was identified, the polymerization was completed. Further, the polymerizer was allowed to stand at this state for approximately 14 hours.

Then, it was identified that the temperature of the content was decreased to room temperature, and 1.50 kg of tetrahydrofuran were charged into the polymerizer. It was identified that the polycarbonate formed through polymerization thereby began to dissolve, and the stirring was started at 30 rpm. The solution completely dissolved was then gradually added dropwise to 7.50 liters of distilled water over the course of 20 hours. The precipitate was separated through filtration, and dried at 100° C. and reduced pressure of 70 mmHg or more for 40 hours to obtain 231 g of the polycarbonate.

Figure 10:
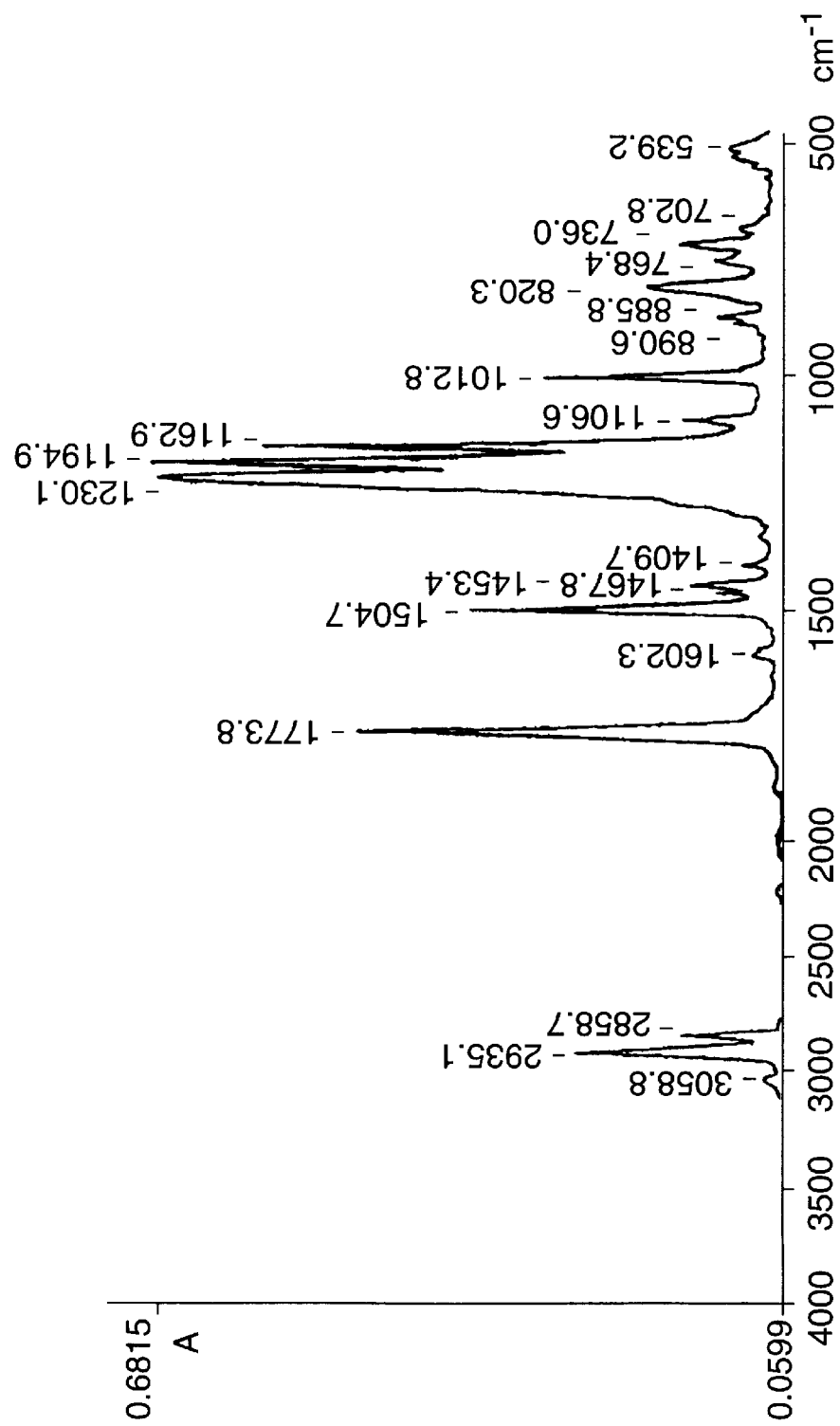
FIG. 10 is an IR spectrum of a high-molecular-weight polycarbonate obtained in Example 1.
Figure 11:
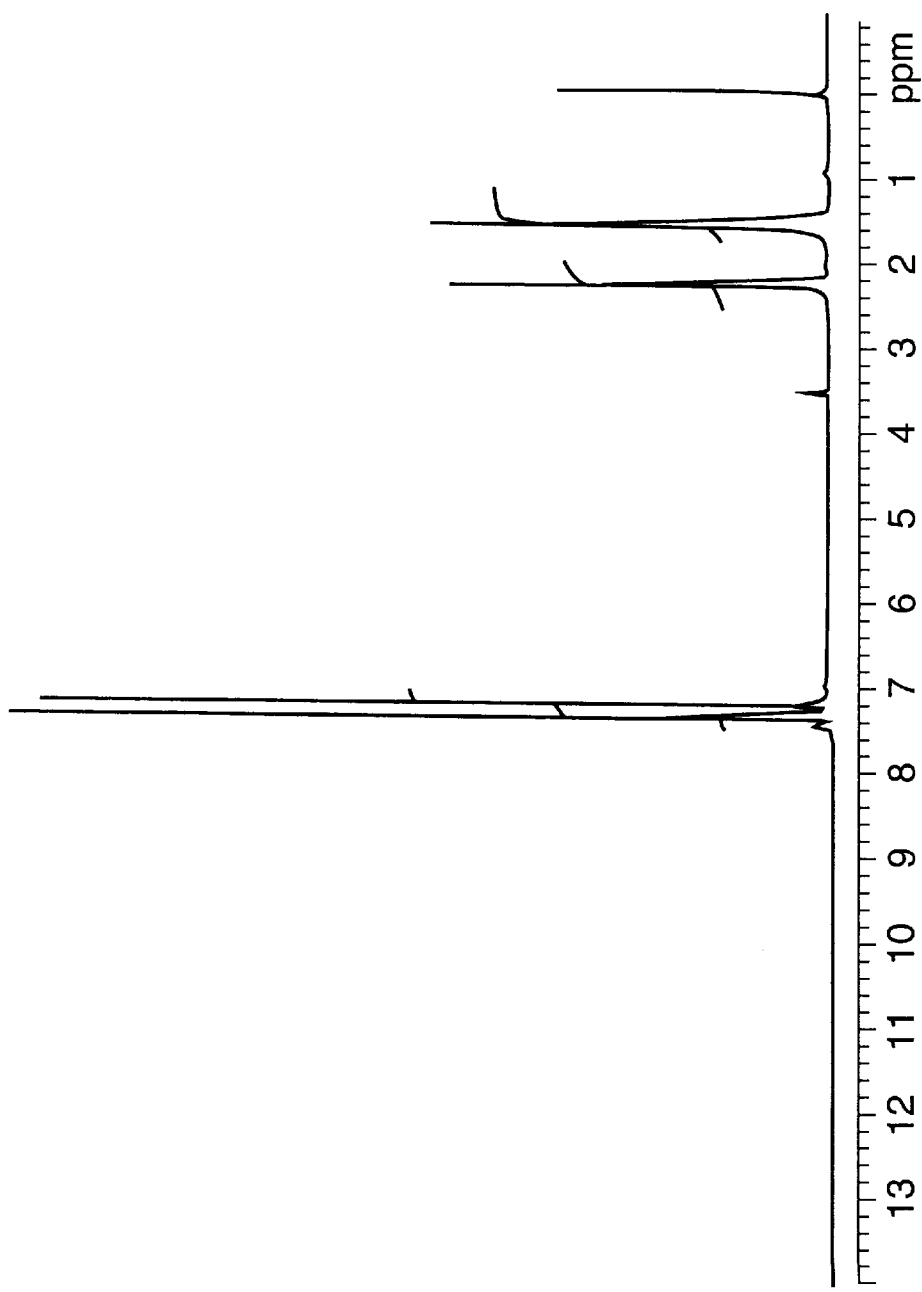
FIG. 11 is an NMR spectrum of a high-molecular-weight polycarbonate obtained in Example 1.

The IR spectrum (measured with SYSTEM-2000 supplied by Parkin Elmer) of the resulting polycarbonate is shown in FIG. 10, and the $H^1$-BMR (UNITY-300/300 MHz, supplied by Varian) spectrum thereof in FIG. 11.

In FIG. 10, a peak ascribable to carbonyl was observed at 1,773 $cm^{-1}$, and a peak ascribable to a cyclohexane ring at from 1,000 to 1,600 $cm^{-1}$. Further, in FIG. 11, a peak showing the presence of hydrogen directly bound to phenylene was observed near 7 ppm, and peaks showing the presence of hydrogen directly bound to cyclohexane near 1.5 ppm and 2.3 ppm. The peak integral ratio thereof was 7 mmp/2.3 ppm/1.5 ppm=8/4/6. These spectra revealed that the desired polycarbonate was obtained.

In addition, the molecular weight thereof was measured through gel permeation chromatography (HLC 8020, supplied by Tosoh Corp., calculated as tetrahydrofuran solvent/polystyrene). Consequently, the resulting polycarbonate was a high-molecular-weight polycarbonate having a weight average molecular weight of 100,000. Further, the residual amount of zinc oxide in the resulting high-molecular-weight polycarbonate was measured with fluorescent X-rays, and it was found to be 24 ppm.

Example 2

Example 1 was repeated except that the amount of zinc oxide was changed to 22.3 mg to obtain 230 g of a polycarbonate. The weight average molecular weight of the resulting polycarbonate was measured as in Example 1. The polycarbonate was a high-molecular-weight polycarbonate having a weight average molecular weight of 80,000.

Example 3

Example 1 was repeated except that the amount of zinc oxide was changed to 15.2 mg to obtain 231 g of a polycarbonate. The weight average molecular weight of the resulting polycarbonate was measured as in Example 1. The polycarbonate was a high-molecular-weight polycarbonate having a weight average molecular weight of 150,000.

Example 4

2,2-Bis(4-hydroxyphenyl)propane (0.80 mols), 0.88 mols of diphenyl carbonate and 10.2 mg of zinc oxide were charged into a 1-liter polymerizer. Immediately after the charging, the inside of the polymerizer was thoroughly purged with nitrogen, and the pressure was then reduced to 30 mmHg. Under this reduced pressure, the content was heated to 180° C., and the stirring of the content was started at 150 rpm. At this time, a top temperature of a fractionating column was elevated to 140° C., and the distillation of phenol was started. Further, the reaction was conducted for 1 hour while maintaining the temperature of the content at 180° C. When the amount of phenol distilled exceeded 80% of the theoretical amount, the pressure inside the polymerizer was progressively reduced to 0.7 torr over the course of 1 hour. At this time, the amount of phenol distilled exceeded 90% of the theoretical amount.

Subsequently, the temperature of the content was elevated to 220° C. at a rate of 20° C./hour and further to 280° C. at a rate of 10° C./hour. The reaction was conducted for 10 hours while maintaining this temperature and the degree of vacuum of 1 torr or less. When the increase in the stirring torque inside the polymerizer was identified, the polymerization was completed. Further, the polymerizer was allowed to stand at this state for approximately 12 hours.

Then, it was identified that the temperature of the content was decreased to room temperature, and 1.50 kg of tetrahydrofuran were charged into the polymerizer. It was identified that the polycarbonate formed through polymerization thereby began to dissolve, and the stirring was started at 30 rpm. The solution completely dissolved was then gradually added dropwise to 7.50 liters of distilled water over the course of 20 hours. The precipitate was separated through filtration, and dried at 100° C. and reduced pressure of 70 mmHg or more for 40 hours to obtain the polycarbonate.

The molecular weight of the resulting polycarbonate was measured as in Example 1. The polycarbonate was a high-molecular-weight polycarbonate having a weight average molecular weight of 120,000.

Example 5

(1,1-Biphenyl)-4,4'-diol (0.80 mols), 0.88 mols of diphenyl carbonate and 8.5 mg of zinc oxide were charged into a 1-liter polymerizer. Immediately after the charging, the inside of the polymerizer was thoroughly purged with nitrogen, and the pressure was then reduced to30mmHg. Under this reduced pressure, the content was heated to 200° C., and the stirring of the content was started at 150 rpm. At this time, a top temperature of a fractionating column was elevated to 140° C., and the distillation of phenol was started. Further, the reaction was conducted for 1 hour while maintaining the temperature of the content at 200° C. When the amount of phenol distilled exceeded 80% of the theoretical amount, the pressure inside the polymerizer was progressively reduced to 0.5 torr over the course of 1 hour. At this time, the amount of phenol distilled exceeded 90% of the theoretical amount.

Subsequently, the temperature of the content was elevated to 260° C. at a rate of 20° C./hour and further to 320° C. at a rate of 10° C./hour. The reaction was conducted for 6 hours while maintaining this temperature and the degree of vacuum of 1 torr or less. When the increase in the stirring torque inside the polymerizer was identified, the polymerization was completed. Further, the polymerizer was allowed to stand at this state for approximately 18 hours.

Then, it was identified that the temperature of the content was decreased to room temperature, and 1.50 kg of tetrahydrofuran were charged into the polymerizer. It was identified that the polycarbonate formed through polymerization thereby began to dissolve, and the stirring was started at 30 rpm. The solution completely dissolved was gradually added dropwise to 7.50 liters of distilled water over the course of 20 hours. The precipitate was separated through filtration, and dried at 100° C. and reduced pressure of 70 mmHg or more for 40 hours to obtain the polycarbonate.

The molecular weight of the resulting polycarbonate was measured as in Example 1. The polycarbonate was a high-molecular-weight polycarbonate having a weight average molecular weight of 150,000.

Example 6

2,2-Bis(4-hydroxycyclohexyl) propane (0.80 mols), 0.88 mols of diphenyl carbonate and 10.6 mg of zinc oxide were charged into a 1-liter polymerizer. Immediately after the charging, the inside of the polymerizer was thoroughly purged with nitrogen, and the pressure was then reduced to 30 mmHg. Under this reduced pressure, the content was heated to 160° C., and the stirring of the content was started at 150 rpm. At this time, a top temperature of a fractionating column was elevated to 140° C., and the distillation of phenol was started. Further, the reaction was conducted for 3 hours while maintaining the temperature of the content at 160° C. When the amount of phenol distilled exceeded 80% of the theoretical amount, the pressure inside the polymerizer was progressively reduced to 0.7 torr over the course of 3 hours. At this time, the amount of phenol distilled exceeded 90% of the theoretical amount.

Subsequently, the temperature of the content was elevated to 220° C. at a rate of 20° C./hour and further to 280° C. at a rate of 10° C./hour. The reaction was conducted for 10 hours while maintaining this temperature and the degree of vacuum of 1 torr or less. When the increase in the stirring torque inside the polymerizer was identified, the polymerization was completed. Further, the polymerizer was allowed to stand at this state for approximately 12 hours.

Then, it was identified that the temperature of the content was decreased to room temperature, and 1.50 kg of tetrahydrofuran were charged into the polymerizer. It was identified that the polycarbonate formed through polymerization thereby began to dissolve, and the stirring was started at 30 rpm. The solution completely dissolved was then gradually added dropwise to 7.50 liters of distilled water over the course of 20 hours. The precipitate was separated through filtration, and dried at 80° C. and reduced pressure of 70 mmHg or more for 40 hours to obtain the polycarbonate.

The molecular weight of the resulting polycarbonate was measured as in Example 1. The polycarbonate was a high-molecular-weight polycarbonate having a weight average molecular weight of 100,000.

Example 7

(1,1'-Bicyclohexyl)-4,4'-diol (0.80 mols), 0.88 mols of diphenyl carbonate and 10.6 mg of zinc oxide were charged into a 1-liter polymerizer. Immediately after the charging, the inside of the polymerizer was thoroughly purged with nitrogen, and the pressure was reduced to 30 mmHg. Under this reduced pressure, the content was heated to 160° C., and the stirring of the content was started at 150 rpm. At this time, a top temperature of a fractionating column was elevated to 140° C., and the distillation of phenol was started. Further, the reaction was conducted for 3 hours while maintaining the temperature of the content at 160° C. When the amount of phenol distilled exceeded 80% of the theoretical amount, the pressure inside the polymerizer was progressively reduced to 0.7 torr over the course of 3 hours. At this time, the amount of phenol distilled exceeded 90% of the theoretical amount.

Subsequently, the temperature of the content was elevated to 220° C. at a rate of 20° C./hour and further to 280° C. at a rate of 10° C./hour. The reaction was conducted for 10 hours while maintaining this temperature and the degree of vacuum of 1 torr or less. When the increase in the stirring torque inside the polymerizer was identified, the polymerization was completed. Further, the polymerizer was allowed to stand at this state for approximately 12 hours.

Then, it was identified that the temperature of the content was decreased to room temperature, and 1.50 kg of tetrahydrofuran were charged into the polymerizer. It was identified that the polycarbonate formed through polymerization thereby began to dissolve, and the stirring was started at 30 rpm. The solution completely dissolved was then gradually added dropwise to 7.50 liters of distilled water over the course of 20 hours. The precipitate was separated through filtration, and dried at 80° C. and reduced pressure of 70 mmHg or more for 40 hours to obtain the polycarbonate.

The molecular weight of the resulting polycarbonate was measured as in Example 1. The polycarbonate was a high-molecular-weight polycarbonate having a weight average molecular weight of 100,000.

Example 8

1,4-Cyclohexanediol (0.80 mols), 0.88 mols of diphenyl carbonate and 5.68 mg of zinc oxide were charged into a 1-liter polymerizer. Immediately after the charging, the inside of the polymerizer was thoroughly purged with nitrogen, and the pressure was then reduced to 30 mmHg. Under this reduced pressure, the content was heated to 160° C., and the stirring of the content was started at 150 rpm. At this time, a top temperature of a fractionating column was elevated to 140° C., and the distillation of phenol was started. Further, the reaction was conducted for 3 hours while maintaining the temperature of the content at 160° C. When the amount of phenol distilled exceeded 80% of the theoretical amount, the pressure of the polymerizer was progressively reduced to 0.7 torr over the course of 3 hours. At this time, the amount of phenol distilled exceeded 90% of the theoretical amount.

Subsequently, the temperature of the content was elevated to 220° C. at a rate of 20° C./hour and further to 260° C. at a rate of 10° C./hour. The reaction was conducted for 18 hours while maintaining this temperature and the degree of vacuum of 1 torr or less. When the increase in the stirring torque inside the polymerizer was identified, the polymerization was completed. Further, the polymerizer was allowed to stand at this state for approximately 12 hours.

Then, it was identified that the temperature of the content was decreased to room temperature, and 1.50 kg of tetrahydrofuran were charged into the polymerizer. It was identified that the polycarbonate formed through polymerization thereby began to dissolve, and the stirring was started at 30 rpm. The solution completely dissolved was then gradually added dropwise to 7.50 liters of distilled water over the course of 20 hours. The precipitate was separated through filtration, and dried at 80° C. and reduced pressure of 70 mmHg or more for 40 hours to obtain the polycarbonate.

The molecular weight of the resulting polycarbonate was measured as in Example 1. The polycarbonate was a high-molecular-weight polycarbonate having a weight average molecular weight of 150,000.

Example 9

Ethylene glycol (0.80 mols), 0.88 mols of diphenyl carbonate and 3.52 mg of zinc oxide were charged into a 1-liter polymerizer. Immediately after the charging, the inside of the polymerizer was thoroughly purged with nitrogen, and the pressure was then reduced to 30 mmHg. Under this reduced pressure, the content was heated to 180° C., and the stirring of the content was started at 150 rpm. At this time, a top temperature of a fractionating column was elevated to 140° C., and the distillation of phenol was started. Further, the reaction was conducted for 3 hours while maintaining the temperature of the content at 180° C. When the amount of phenol distilled exceeded 80% of the theoretical amount, the pressure of the polymerizer was progressively reduced to 0.7 torr over the course of 3 hours. At this time, the amount of phenol distilled exceeded 90% of the theoretical amount.

Subsequently, the temperature of the content was elevated to 240° C. at a rate of 20° C./hour and further to 280° C. at a rate of 10° C./hour. The reaction was conducted for 18 hours while maintaining this temperature and the degree of vacuum of 1 torr or less. When the increase in the stirring torque inside the polymerizer was identified, the polymerization was completed. Further, the polymerizer was allowed to stand at this state for approximately 12 hours.

Then, it was identified that the temperature of the content was decreased to room temperature, and 1.50 kg of tetrahydrofuran were charged into the polymerizer. It was identified that the polycarbonate formed through polymerization thereby began to dissolve, and the stirring was started at 30 rpm. The solution completely dissolved was then gradually added dropwise to 7.50 liters of distilled water over the course of 20 hours. The precipitate was separated through filtration, and dried at 80° C. and reduced pressure of 70 mmHg or more for 40 hours to obtain the polycarbonate.

The molecular weight of the resulting polycarbonate was measured as in Example 1. The polycarbonate was a high-molecular-weight polycarbonate having a weight average molecular weight of 200,000.

Example 10

1,1-Bis(4-hydroxyphenyl)cyclohexane (0.40 mols), 0.40 mols of 2,6-naphthalenediol, 0.88 mols of diphenyl carbonate and 9.08 mg of zinc oxide were charged into a 1-liter polymerizer. Immediately after the charging, the inside of the polymerizer was thoroughly purged with nitrogen, and the pressure was then reduced to 30 mmHg. Under this reduced pressure, the content was heated to 180° C., and the stirring of the content was started at 150 rpm. At this time, a top temperature of a fractionating column was elevated to 140° C., and the distillation of phenol was started. Further, the reaction was conducted for 1 hour while maintaining the temperature of the content at 180° C. Then, the distillation of phenol stopped. Accordingly, the temperature of the content was elevated to 220° C. at a rate of 10° C./hour. The reaction was further conducted for 1 hour while maintaining the temperature of the content at 180° C. When the amount of phenol distilled exceeded 80% of the theoretical amount, the pressure of the polymerizer was progressively reduced to 0.7 torr over the course of 1 hour. At this time, the amount of phenol distilled exceeded 90% of the theoretical amount.

Subsequently, the temperature of the content was elevated to 280° C. at a rate of 20° C./hour and further to 320° C. at a rate of 10° C./hour. The reaction was conducted for 7 hours while maintaining this temperature and the degree of vacuum of 1 torr or less. When the increase in the stirring torque inside the polymerizer was identified, the polymerization was completed. Further, the polymerizer was allowed to stand at this state for approximately 14 hours.

Then, it was identified that the temperature of the content was decreased to room temperature, and 1.50 kg of tetrahydrofuran were charged into the polymerizer. It was identified that the polycarbonate formed through polymerization thereby began to dissolve, and the stirring was started at 30 rpm. The solution completely dissolved was then gradually added dropwise to 7.50 liters of distilled water over the course of 20 hours. The precipitate was separated through filtration, and dried at 100° C. and reduced pressure of 70 mmHg or more for 40 hours to obtain the polycarbonate.

The molecular weight of the resulting polycarbonate was measured as in Example 1. The polycarbonate was a high-molecular-weight polycarbonate having a weight average molecular weight of 100,000.

Example 11

1,1-Bis(4-hydroxyphenyl)cyclohexane (0.80 mols), 0.88 mols of dimethyl carbonate and 9.8 mg of zinc oxide were charged into a 1-liter polymerizer. Immediately after the charging, the inside of the polymerizer was thoroughly purged with nitrogen, and the pressure was then reduced to 30 mmHg. Under this reduced pressure, the content was heated to 180° C., and the stirring of the content was started at 150 rpm. At this time, a top temperature of a fractionating column was elevated to 60° C., and the distillation of methanol was started. Further, the reaction was conducted for 1 hour while maintaining the temperature of the content at 180° C. When the amount of methanol distilled exceeded 80% of the theoretical amount, the pressure of the polymerizer was progressively reduced to 0.7 torr over the course of 1 hour. At this time, the amount of methanol distilled exceeded 90% of the theoretical amount.

Subsequently, the temperature of the content was elevated to 260° C. at a rate of 20° C./hour and further to 300° C. at a rate of 10° C./hour. The reaction was conducted for 7 hours while maintaining this temperature and the degree of vacuum of 1 torr or less. When the increase in the stirring torque inside the polymerizer was identified, the polymerization was completed. Further, the polymerizer was allowed to stand at this state for approximately 14 hours.

Then, it was identified that the temperature of the content was decreased to room temperature, and 1.50 kg of tetrahydrofuran were charged into the polymerizer. It was identified that the polycarbonate formed through polymerization thereby began to dissolve, and the stirring was started at 30 rpm. The solution completely dissolved was then gradually added dropwise to 7.50 liters of distilled water over the course of 20 hours. The precipitate was separated through filtration, and dried at 100° C. and reduced pressure of 70 mmHg or more for 40 hours to obtain the polycarbonate.

The molecular weight of the resulting polycarbonate was measured as in Example 1. The polycarbonate was a high-molecular-weight polycarbonate having a weight average molecular weight of 90,000.

Example 12

1,1-Bis(4-hydroxyphenyl)cyclohexane (0.80 mols), 0.44 mols of diphenyl carbonate, 0.44 mols of dimethyl carbonate and 8.5 mg of zinc oxide were charged into a 1-liter polymerizer. Immediately after the charging, the inside of the polymerizer was thoroughly purged with nitrogen, and the pressure was then reduced to 30 mmHg. Under this reduced pressure, the content was heated to 180° C., and the stirring of the content was started at 150 rpm. At this time, a top temperature of a fractionating column was elevated to 60° C., and the distillation of methanol was started. Ten minutes later, the top temperature of the fractionating column was elevated to 100° C., and the distillation of an azeotrope of methanol and phenol was started. Further, the reaction was conducted for 1 hour while maintaining the temperature of the content at 180° C. When the amount of the azeotrope of methanol and phenol distilled exceeded 80% of the theoretical amount, the pressure of the polymerizer was progressively reduced to 0.7 torr over the course of 1 hour. At this time, the amount of methanol and phenol distilled exceeded 90% of the theoretical amount.

Subsequently, the temperature of the content was elevated to 260° C. at a rate of 20° C./hour and further to 300° C. at a rate of 10° C./hour. The reaction was conducted for 7 hours while maintaining this temperature and the degree of vacuum of 1 torr or less. When the increase in the stirring torque inside the polymerizer was identified, the polymerization was completed. Further, the polymerizer was allowed to stand at this state for approximately 14 hours.

Then, it was identified that the temperature of the content was decreased to room temperature, and 1.50 kg of tetrahydrofuran were charged into the polymerizer. It was identified that the polycarbonate formed through polymerization thereby began to dissolve, and the stirring was started at 30 rpm. The solution completely dissolved was then gradually added dropwise to 7.50 liters of distilled water over the course of 20 hours. The precipitate was separated through filtration, and dried at 100° C. and reduced pressure of 70 mmHg or more for 40 hours to obtain the polycarbonate.

The molecular weight of the resulting polycarbonate was measured as in Example 1. The polycarbonate was a high-molecular-weight polycarbonate having a weight average molecular weight of 100,000.

Example 13

A polycarbonate was obtained in the same manner as in Example 1 except that 7.1 mg of zinc oxide used as a catalyst in Example 1 were replaced with 7.1 mg of antimony trioxide.

The molecular weight of the resulting polycarbonate was measured as in Example 1. The polycarbonate was a high-molecular-weight polycarbonate having a weight average molecular weight of 70,000.

Example 14

A polycarbonate was obtained in the same manner as in Example 1 except that 7.1 mg of zinc oxide used as a catalyst in Example 1 were replaced with 7.1 mg of zinc oxide.

The molecular weight of the resulting polycarbonate was measured as in Example 1. The polycarbonate was a high-molecular-weight polycarbonate having a weight average molecular weight of 70,000.

Comparative Example 1

A polycarbonate was obtained in the same manner as in Example 1 except that 7.1 mg of zinc oxide used as a catalyst in Example 1 were replaced with 7.1 mg of tetrabutoxytitanium.

The molecular weight of the resulting polycarbonate was measured as in Example 1. The polycarbonate was a high-molecular-weight polycarbonate having a weight average molecular weight of 20,000.

Comparative Example 2

A polycarbonate was obtained in the same manner as in Example 1 except that 7.1 mg of zinc oxide used as a catalyst in Example 1 were replaced with 7.1 mg of calcium acetate.

The molecular weight of the resulting polycarbonate was measured as in Example 1. The polycarbonate was a high-molecular-weight polycarbonate having a weight average molecular weight of 20,000.

Comparative Example 3

A polycarbonate was obtained in the same manner as in Example 1 except that 7.1 mg of zinc oxide used as a catalyst in Example 1 were replaced with 7.1 mg of metallic sodium.

The molecular weight of the resulting polycarbonate was measured as in Example 1. The polycarbonate was a high-molecular-weight polycarbonate having a weight average molecular weight of 15,000.

Comparative Example 4

1,1-Bis(hydroxyphenyl)cyclohexane (0.5 mols), 1.5 mols of sodium hydroxide and 0.005 mols of benzyltriethylammonium chloride were charged into a 5-liter flask, and dissolved in 2 liters of deionized water. The mixture was stirred, and 2 liters of methylene chloride were further added thereto. Subsequently, the inside of the flask was maintained at 10° C., and 0.55 mols of phosgene were gradually added to the methylene chloride layer over the course of 1 hour while being stirred. After the dropwise addition of total phosgene was completed, the stirring was continued for 1 hour. To this were added 2.5 ml of tetrabutylamine, and the mixture was further vigorously stirred for 20 hours. The resulting methylene chloride layer was washed with 2 liters of distilled water, acid and alkali in this order, and precipitated in 7 liters of methanol. The resulting polycarbonate was separated through filtration, and dried at 80° C. in vacuo for 8 hours to obtain 110 g of the polycarbonate.

The molecular weight of the resulting polycarbonate was measured as in Example 1. The polycarbonate was a high-molecular-weight polycarbonate having a weight average molecular weight of 70,000.

The results obtained in Examples 1 to 14 and Comparative Examples 1 to 4 are shown in Table 6.

TABLE 6

|  | Diol | Dicarbonate ester | Catalyst | Amount of catalyst (per ppm of polymer) | Weight average molecular weight |
|---|---|---|---|---|---|
| Ex. 1 | 1,1-bis(4-hydroxyphenyl)cyclohexane | diphenyl carbonate | zinc oxide | 30 | 100,000 |
| Ex. 2 | 1,1-bis(4-hydroxyphenyl)cyclohexane | diphenyl carbonate | zinc oxide | 95 | 80,000 |
| Ex. 3 | 1,1-bis(4-hydroxyphenyl)cyclohexane | diphenyl carbonate | zinc oxide | 65 | 150,000 |
| Ex. 4 | 2,2-bis(4-hydroxyphenyl)propane | diphenyl carbonate | zinc oxide | 50 | 120,000 |
| Ex. 5 | (1,1'-biphenyl)-4,4'-diol | diphenyl carbonate | zinc oxide | 50 | 150,000 |
| Ex. | 2,2-bis(4-hydroxy- | diphenyl | zinc | 50 | 100,000 |

TABLE 6-continued

| | Diol | Dicarbonate ester | Catalyst | Amount of catalyst (per ppm of polymer) | Weight average molecular weight |
|---|---|---|---|---|---|
| | 6 cyclohexyl)propane | carbonate | oxide | | |
| Ex. 7 | (1,1-bicyclo-hexyl)-4,4'-diol | diphenyl carbonate | zinc oxide | 50 | 100,000 |
| Ex. 8 | 1,4-cyclohexanediol | diphenyl carbonate | zinc oxide | 50 | 150,000 |
| Ex. 9 | ethylene glycol | diphenyl carbonate | zinc oxide | 50 | 200,000 |
| Ex. 10 | 1,1-bis(4-hydroxy-phenyl)cyclohexane/ 2,6-naphthalene-diol = 1/1 | diphenyl carbonate | zinc oxide | 50 | 100,000 |
| Ex. 11 | 1,1-bis(4-hydroxy-phenyl)cyclohexane | dimethyl carbonate | zinc oxide | 50 | 90,000 |
| Ex. 12 | 1,1-bis(4-hydroxy-phenyl)cyclohexane | diphenyl carbonate/ dimethyl carbonate = 1/1 | zinc oxide | 50 | 100,000 |
| Ex. 13 | 1,1-bis(4-hydroxy-phenyl)cyclohexane | diphenyl carbonate | antimony trioxide | 30 | 70,000 |
| Ex. 14 | 1,1-bis(4-hydroxy-phenyl)cyclohexane | diphenyl carbonate | lead oxide | 30 | 70,000 |
| CEx. 1 | 1,1-bis(4-hydroxy-phenyl)cyclohexane | diphenyl carbonate | tetra-butoxy titanium | 30 | 20,000 |
| CEx. 2 | 1,1-bis(4-hydroxy-phenyl)cyclohexane | diphenyl carbonate | calcium acetate | 30 | 20,000 |
| CEx. 3 | 1,1-bis(4-hydroxy-phenyl)cyclohexane | diphenyl carbonate | metallic sodium | 30 | 15,000 |
| CEx. 4 | 1,1-bis(4-hydroxy-phenyl)cyclohexane | phosgene | tetrabut-ylamine | — | 70,000 |

Ex.—Example, CEx.—Comparative Example

As is clear from the results in Table 6, the invention provides the high-molecular-weight polycarbonate having the weight average molecular weight of 50,000 or more in particular by the polymerization through transesterification in the presence of the basic oxide catalysts, whereas no high-molecular-weight polycarbonate is obtained in the presence of the other catalysts as shown in Comparative Examples because the polymerization reaction through transesterification does not proceed satisfactorily. Further, in the invention, especially when the basic oxide catalyst is used in the amount of from 20 to 100 ppm, the higher-molecular-weight polycarbonates can be obtained.

Example 15

An electrophotographic photoreceptor was produced by the following process using the polycarbonate obtained in Example 1 as a binder resin.

First, 170 parts by weight of n-butyl alcohol containing 4 parts by weight of a polyvinyl butyral resin (Esleck BM-S, supplied by Sekisui Chemical Co., Ltd.) were mixed with a mixture of 30 parts by weight of an organozirconium compound (acetylacetone zirconium butyrate) and an organosilane compound (γ-aminopropyltrimethoxysilane), and the these were stirred to obtain an undercoat layer coating solution. Then, an ED tube aluminum substrate having a diameter of 30 mm which had been roughened to an arithmertical mean deviation of the profile Ra of 0.18 $\mu$m by liquid horning treatment using an alumina spherical fine powder (D50=30 $\mu$m) was dip-coated with the undercoat layer coating solution, and the coated substrate was hardened at 150° C. for 1 hour to form an undercoat layer having a film thickness of 1.2 $\mu$m.

Subsequently, as a charge generation material, a mixture comprising 3 parts by weight of chlorogallium phthalocyanine having clear X-ray diffraction peaks at 7.4°, 16.6°, 25.5° and 28.3°, 2 parts by weight of a vinyl chloride-vinyl acetate copolymer (VMCH, supplied by Nippon Unicar) and 180 parts by weight of butyl acetate was dispersed for 4 hours using a sand mill. The resulting coating solution was dip-coated on the undercoat layer, and the thus-obtained layer was dried to form a charge generation layer having a film thickness of 0.2 $\mu$m.

Thereafter, a coating solution obtained by dissolving 6 parts by weight of the polycarbonate obtained in Example 1, 4 parts by weight of N,N'-diphenyl-N,N'-bis(3-methylphenyl)-[1,1'-biphenyl]-4,4'-diamine designated compound No. 1-1 in Table 1 and 0.2 parts by weight of 2,6-di-t-butyl-4-methylphenol in 80 parts by weight of tetrahydrofuran was dip-coated on the charge generation layer. The thus-coated layer was dried at 120° C. for 40 minutes to form a charge transport layer having a film thickness of 25 $\mu$m. Thus, a three-layer electrophotographic photoreceptor was produced.

The resulting electrophotographic photoreceptor was mounted on a printer of a contact charging system (PC-PR 1000/4R, supplied by NEC), and a print test of 50,000 sheets was carried out to measure and evaluate the electrophotographic characteristics. At this time, a charge potential and a residual potential of the photoreceptor, the image quality of the image-formed print and the amount of wear of the photoreceptive layer after the test of 50,000 sheets were measured. The results obtained are shown in Table 7.

Examples 16 to 28

Electrophotographic photoreceptors were produced in the same manner as in Example 15 except that the polycarbonate obtained in Example 1 and used as the binder resin of the charge transport layer in Example 15 was replaced with the polycarbonates obtained in Examples 2 to 14 in this order. Further, the electrophotographic characteristics were measured and evaluated as in Example 15 using the resulting electrophotographic photoreceptors. The results obtained are shown in Table 7.

Comparative Examples 5 to 8

Electrophotographic photoreceptors were produced in the same manner as in Example 15 except that the polycarbonate obtained in Example 1 and used as the binder resin of the charge transport layer in Example 15 was replaced with the polycarbonates obtained in Comparative Examples 1 to 4 in this order. Further, the electrophotographic characteristics were measured and evaluated as in Example 15 using the resulting electrophotographic photoreceptors. The results obtained are shown in Table 7.

The results obtained in Examples 15 to 28 and Comparative Examples 5 to 8 are shown in Table 7.

TABLE 7

| | Charge transfer material | Residua potential (V) | Charge potential (V) | Amount of wear ($\mu$m) | Image quality |
|---|---|---|---|---|---|
| Ex. 15 | 1-1 | −25 | −600 | 4 | no abnormality |
| Ex. 16 | 1-1 | −20 | −600 | 5 | no abnormality |
| Ex. 17 | 1-1 | −25 | −590 | 3 | no abnormality |
| Ex. 18 | 1-1 | −35 | −600 | 4 | no abnormality |
| Ex. 19 | 1-1 | −30 | −590 | 3 | no abnormality |

TABLE 7-continued

| | Charge transfer material | Residua potential (V) | Charge potential (V) | Amount of wear (μm) | Image quality |
|---|---|---|---|---|---|
| Ex. 20 | 1-1 | −40 | −580 | 5 | no abnormality |
| Ex. 21 | 1-1 | −40 | −580 | 7 | no abnormality |
| Ex. 22 | 1-1 | −40 | −580 | 8 | no abnormality |
| Ex. 23 | 1-1 | −45 | −570 | 8 | no abnormality |
| Ex. 24 | 1-1 | −35 | −600 | 5 | no abnormality |
| Ex. 25 | 1-1 | −25 | −590 | 4 | no abnormality |
| Ex. 26 | 1-1 | −25 | −600 | 4 | no abnormality |
| Ex. 27 | 1-1 | −25 | −590 | 6 | no abnormality |
| Ex. 28 | 1-1 | −25 | −600 | 6 | no abnormality |
| CEx. 5 | 1-1 | −25 | −500 | 25 | leak occurrence/ fog on whole image |
| CEx. 6 | 1-1 | −25 | −550 | 25 | leak occurrence/ fog on whole image |
| CEx. 7 | 1-1 | −25 | −540 | 34 | leak occurrence/ fog on whole image |
| CEx. 8 | 1-1 | −25 | −560 | 6 | leak occurrence/ fog on whole image |

Ex.—Example, CEx.—Comparative Example

When the photoreceptors of Examples 15 to 28 formed by using the polycarbonates obtained in Examples 1 to 14 as a binder resin of a surface layer were subjected to a print test with a printer having a contact charge device, the stable electrical characteristics were provided with less wear of the photoreceptor surface and without the decrease in the charge property of the photoreceptor and the increase in the residual potential. Further, no abnormality of image quality owing to leak discharge of a photoreceptor was observed.

Meanwhile, with respect to the photoreceptors of Comparative Examples 5 to 7 formed by using the polycarbonates obtained in Comparative Examples 1 to 3, the wear was great owing to the low molecular weight of the polycarbonates. Dark decay was increased to decrease the charging property, and the fog was observed in the image of the low-density portion. Further, the current leak occurred from the contact charge device in the portion having the decreased film thickness owing to the wear. Accordingly, running had to be conducted by repairing this leaked portion with an insulation material. This portion had the defective image quality. Further, with respect to the photoreceptor of Comparative Example 8, the wear of the photoreceptor was low, but the current leak occurred from the contact charge device owing to the corrosion of the photoreceptor by chlorine remaining in the polycarbonate, and running had to be conducted by repairing this leaked portion with an insulation material. This portion had the defective image quality.

Examples 29 to 42

Sixteen parts by weight of a polyvinyl butyral resin (Esleck BM-S, supplied by Sekisui Chemical Co., Ltd.) were mixed with 550 parts by weight of cyclohexanone while being stirred. Then, 8 parts by weight of a resol-type phenolic resin (Phenolite J-325, supplied by Dainippon Ink and Chemicals, Incorporated) were added thereto, and the mixture was stirred. To this solution were further added 60 parts by weight of a titanium oxide pigment. These were dispersed for 5 hours using a sand grinding mill to obtain an undercoat layer coating solution. Then, an aluminum substrate having a diameter of 84 mm which had been roughened to an arithmetical mean deviation of the profile Ra of 0.18 μm by liquid horning treatment was coated with this coating solution using a ring coater, and the coated substrate was hardened at 170° C. for 1 hour to form an undercoat layer having a film thickness of 4 βm.

Subsequently, as a charge generation material, a mixture of 15 parts by weight of titanyl phthalocyanine having clear X-ray diffraction peaks at 9.5°, 11.7°, 15.0°, 24.1 and 27.3°, 10 parts by weight of a polyvinyl butyral resin (Esleck BM-S, supplied by Sekisui Chemical Co., Ltd.) and 300 parts by weight of n-butyl alcohol was dispersed for 4 hours using a sand mill. The resulting coating solution was coated on the undercoat layer, and the thus-obtained layer was dried to form a charge generation layer having a film thickness of 0.2 μm.

Thereafter, a coating solution obtained by dissolving 4 parts by weight of N,N-bis(3,4-dimethylphenyl)biphenyl-4-amine as a charge transfer material, designated compound No. 2–33 in Table 4, and 6 parts by weight of the polycarbonate obtained in each of Examples 1 to 14 in 80 parts by weight of chlorobenzene was coated on the charge generation layer. The thus-coated layer was dried to form a charge transport layer having a film thickness of 27 μm. Thus, a three-layer electrophotographic photoreceptor was produced.

The resulting electrophotographic photoreceptor was mounted on a color copier (Acolor-635, supplied by Fuji Xerox) of an intermediate transfer drum system, and a printing procedure was conducted by adjusting an amount of light. The results on the image quality of the photoreceptor obtained at this time are shown in Table 8.

Comparative Examples 9 to 12

Electrophotographic receptors were produced in the same manner as in Example 29 except that the polycarbonate obtained in Example 1 and used as the binder resin of the charge transfer layer in Example 29 was replaced with the polycarbonates obtained in Comparative Examples 1 to 4 in this order. The resulting electrophotographic photoreceptors were evaluated as in Example 29 using the same color copier of the intermediate transfer drum system. The results are also shown in Table 8.

The results obtained in Examples 29 to 42 and Comparative Examples 9 to 12 are shown in Table 8.

TABLE 8

| | Binder resin | Charge transfer material | Fog | Number of black spots (per cm²) |
|---|---|---|---|---|
| Ex. 29 | same as in Ex. 1 | 2-33 | no abnormality | 25 |
| Ex. 30 | same as in Ex. 2 | 2-33 | no abnormality | 28 |
| Ex. 31 | same as in Ex. 3 | 2-33 | no abnormality | 25 |
| Ex. 32 | same as in Ex. 4 | 2-33 | no abnormality | 35 |
| Ex. 33 | same as in Ex. 5 | 2-33 | no abnormality | 30 |
| Ex. 34 | same as in Ex. 6 | 2-33 | no abnormality | 40 |
| Ex. 35 | same as in Ex. 7 | 2-33 | no abnormality | 42 |
| Ex. 36 | same as in Ex. 8 | 2-33 | no abnormality | 45 |
| Ex. 37 | same as in Ex. 9 | 2-33 | no abnormality | 38 |
| Ex. 38 | same as in Ex. 10 | 2-33 | no abnormality | 42 |
| Ex. 39 | same as in Ex. 11 | 2-33 | no abnormality | 25 |
| Ex. 40 | same as in Ex. 12 | 2-33 | no abnormality | 27 |
| Ex. 41 | same as in Ex. 13 | 2-33 | no abnormality | 30 |
| Ex. 42 | same as in Ex. 14 | 2-33 | no abnormality | 28 |
| CEx. 9 | same as in CEx. 1 | 2-33 | Fog occurs. | 125 |
| CEx. 10 | same as in CEx. 2 | 2-33 | Fog occurs. | 108 |
| CEx. 11 | same as in CEx. 3 | 2-33 | Fog occurs. | 150 |
| CEx. 12 | same as in CEx. 4 | 2-33 | Fog occurs. | 125 |

Ex.—Example, CEx.—Comparative Example

With respect to the photoreceptors in Examples 29 to 42 which were formed by using the polycarbonates obtained in Examples 1 to 14 as the binder resin of the surface layer, no image fog occurred, and the number of black spots was small. Thus, the good image qualities were provided.

Meanwhile, with respect to the photoreceptors of Comparative Examples 9 to 11 which were formed by using the polycarbonates obtained in Comparative Examples 1 to 3, the image fog occurred owing to the wear of the surface layer caused by the low molecular weight of the polycarbonates, and the number of black spots was large. Thus, the image abnormality was observed. Further, in the photoreceptor of Comparative Example 12, the image fog occurred owing to the corrosion of the photoreceptor by the residual chlorine in the binder resin, and the number of black spots was large. Thus, the image abnormality was observed.

Examples 43 to 56

A coating solution comprising 10 parts by weight of a polyamide resin, 150 parts by weight of methyl alcohol and 40 parts by weight of water was coated on an electroconductive support (Metalmy, supplied by Toray Industries Inc.) obtained by forming an aluminum deposition coating on a surface of a polyethylene terephthalate film, and this was dried to form an undercoat layer having a film thickness of 1 lm. Then, a mixture comprising 9 parts by weight of hydroxygallium phthalocyanine having diffraction peaks at 7.5°, 9.9°, 12.5°, 16.3°, 18.6°, 25.1° and 28.10, 2 parts by weight of a polyvinyl butyral resin (Esleck BM-1, supplied by Sekisui Chemical) and 30 parts by weight of n-butyl alcohol was charged into a ball mill pot, and milled for 60 hours using SUS stainless steel balls (⅛ inch in diameter) as a milling member. Further, the mixture was diluted with the addition of 30 parts by weight of n-butyl alcohol, and stirred. The solution was coated on the undercoat layer, and the thus-coated layer was dried to obtain a charge generation layer having a film thickness of 0.3 µm.

Subsequently, 4 parts by weight of N,N'-diphenyl-N,N'-bis(3-methylphenyl)-[1,1'-biphenyl]-4,4'-diami designated compound No. 1-1 in Table 1 and 6 parts by weight of the polycarbonate obtained in each of Examples 1 to 14 were dissolved in 55 parts by weight of methylene chloride, and the solution was coated on the layer to form a charge transfer layer having a film thickness of 25 µm. Thus, a three-layer electrophotographic photoreceptor was produced.

In the resulting electrophotographic photoreceptor, the coating of the photoreceptive layer was peeled off from the electroconductive substrate, and subjected to a repetitive bending test of up to 5,000 times using a bending strength tester. Further, the electrophotographic photoreceptor was formed into a belt, and this belt was mounted on a copier having a belt rotational driving device (Vivace 800, supplied by Fuji Xerox) to conduct a copy running test of up to 100,000 cycles. The results are shown in Table 9.

Comparative Examples 13 to 16

An electrophotographic photoreceptor was produced in the same manner as in Example 43 except that the polycarbonate obtained in each of Comparative Examples 1 to 4 was used as a binder resin of a charge transport layer, and the evaluation was conducted as in Example 43. The results are shown in Table 9.

TABLE 9

| | Binder resin | Charge transfer material | Result of 5000 repetitive bendings | Result of copy running test at 100,000 cycles |
|---|---|---|---|---|
| Ex. 43 | same as in Ex. 1 | 1-1 | not broken | no abnormality |
| Ex. 44 | same as in Ex. 2 | 1-1 | not broken | no abnormality |
| Ex. 45 | same as in Ex. 3 | 1-1 | not broken | no abnormality |
| Ex. 46 | same as in Ex. 4 | 1-1 | not broken | no abnormality |
| Ex. 47 | same as in Ex. 5 | 1-1 | not broken | no abnormality |
| Ex. 48 | same as in Ex. 6 | 1-1 | not broken | no abnormality |
| Ex. 49 | same as in Ex. 7 | 1-1 | not broken | no abnormality |
| Ex. 50 | same as in Ex. 8 | 1-1 | not broken | no abnormality |
| Ex. 51 | same as in Ex. 9 | 1-1 | not broken | no abnormality |
| Ex. 52 | same as in Ex. 10 | 1-1 | not broken | no abnormality |
| Ex. 53 | same as in Ex. 11 | 1-1 | not broken | no abnormality |
| Ex. 54 | same as in Ex. 12 | 1-1 | not broken | no abnormality |
| Ex. 55 | same as in Ex. 13 | 1-1 | not broken | no abnormality |
| Ex. 56 | same as in Ex. 14 | 1-1 | not broken | no abnormality |
| CEx. 13 | same as in CEx. 1 | 1-1 | broken in 40 bendings | occurrence of many fine cracks and corresponding white spots at 500 cycles |
| CEx. 14 | same as in CEx. 2 | 1-1 | broken in 40 bendings | occurrence of many fine cracks and corresponding white spots at 500 cycles |
| CEx. 15 | same as in CEx. 3 | 1-1 | broken in 30 bendings | occurrence of many fine cracks and corresponding white spots at 450 cycles |
| CEx. 16 | same as in CEx. 4 | 1-1 | broken in 600 bendings | occurrence of many fine cracks and corresponding white spots at 4,000 cycles |

Ex.—Example, CEx.—Comparative Example

Since the high-molecular-weight polycarbonates obtained in Examples 1 to 14 were used in the surface layers of the photoreceptors in Examples 43 to 56, these were not broken even after the bending test, and good image qualities were obtained even after the copy running test. Meanwhile, during the binding test, the photoreceptors obtained in Comparative Examples 13 to 15 were broken because of the low molecular weight of the polycarbonates used in the surface layers, and the photoreceptor in Comparative Example 16 was broken owing to the corrosion of the photoreceptor by the residual chlorine. Further, many white spots due to cracks occurred during the copy running test.

What is claimed is:

1. A process for producing a high-molecular-weight polycarbonate, having a weight average molecular weight of at least 50,000, the process comprising polymerizing a diol and a carbonate diester through transesterification with heating in the presence of a basic oxide catalyst.

2. The process of claim 1, wherein the use of the basic oxide catalyst is between 20 and 100 ppm based on the theoretical amount of the resulting high-molecular-weight polycarbonate.

3. The process of claim 1, wherein the polycarbonate is obtained from a solution formed by cooling the polycarbonate resulting from transesterification and then dissolving the polycarbonate in a solvent.

4. The process of claim 1, wherein the basic oxide catalyst is zinc oxide.

5. The process of claim 1, wherein the diol is one or more types selected from the group consisting of bisphenols, hydrogenated bisphenols, biphenols, hydrogenated biphenols, aryldiols, cycloalkanediols and aliphatic diols.

6. The process of claim 1, wherein the carbonate diester is one or more types selected from the group consisting of diaryl carbonates and dialkyl carbonates.

7. A high-molecular-weight polycarbonate obtained by the process of claim 1.

8. The high-molecular-weight polycarbonate of claim 7, wherein the residual amount of the catalyst is between 10 and 100 ppm.

9. An electrophotographic photoreceptor in which a photoreceptive layer is formed on an electroconductive support, characterized in that the photoreceptive layer contains, as a binder resin, a high-molecular-weight polycarbonate having a weight average molecular weight of at least 50,000, obtained by polymerizing a diol and a carbonate diester through transesterification with heating in the presence of a basic oxide catalyst.

10. The electrophotographic photoreceptor of claim 9, wherein the amount of the basic oxide catalyst is between 20 and 100 ppm based on the theoretical amount of the resulting high-molecular-weight polycarbonate.

11. The electrophotographic photoreceptor of claim 9, wherein the high-molecular-weight polycarbonate is a high-molecular-weight polycarbonate obtained from a solution formed by cooling the polycarbonate resulting from transesterification and then dissolving the polycarbonate in a solvent.

12. The electrophotographic photoreceptor of claim 9, wherein the high-molecular-weight polycarbonate is obtained by polymerization in the presence of a zinc oxide catalyst.

13. The electrophotographic photoreceptor of claim 9, wherein the high-molecular-weight polycarbonate is obtained by using one or more types selected from the group consisting of bisphenols, hydrogenated bisphenols, biphenols, hydrogenated biphenols, aryldiols, cycloalkanediols and aliphatic diols as the starting diol.

14. The electrophotographic photoreceptor of claim 9, wherein the high-molecular-weight polycarbonate is obtained by using one or more types selected from the group consisting of diaryl carbonates and dialkyl carbonates as the starting carbonate diester.

15. The electrophotographic photoreceptor of claim 9, wherein the high-molecular-weight polycarbonate is one in which the residual amount of the catalyst is between 10 and 100 ppm.

16. An electrophotographic apparatus which is charged by a contact charge system, characterized by using the electrophotographic photoreceptor of claim 9.

* * * * *